(12) United States Patent
Fukuri et al.

(10) Patent No.: US 8,921,021 B2
(45) Date of Patent: Dec. 30, 2014

(54) POLYESTER RESIN FOR TONER

(75) Inventors: Norihiro Fukuri, Wakayama (JP);
Takashi Kubo, Wakayama (JP);
Yasunori Inagaki, Wakayama (JP);
Katsutoshi Aoki, Wakayama (JP)

(73) Assignee: Kao Corporation, Tokyo (JP)

( * ) Notice: Subject to any disclaimer, the term of this patent is extended or adjusted under 35 U.S.C. 154(b) by 171 days.

(21) Appl. No.: 13/498,501

(22) PCT Filed: Oct. 1, 2010

(86) PCT No.: PCT/JP2010/067228
§ 371 (c)(1),
(2), (4) Date: Mar. 27, 2012

(87) PCT Pub. No.: WO2011/043257
PCT Pub. Date: Apr. 14, 2011

(65) Prior Publication Data
US 2012/0184700 A1    Jul. 19, 2012

(30) Foreign Application Priority Data

Oct. 5, 2009  (JP) ................................ 2009-231747
Jun. 25, 2010  (JP) ................................ 2010-144734
Aug. 6, 2010  (JP) ................................ 2010-177886

(51) Int. Cl.
G03G 9/08  (2006.01)
C08G 63/547  (2006.01)
C08G 63/60  (2006.01)
G03G 9/087  (2006.01)

(52) U.S. Cl.
CPC .............. C08G 63/547 (2013.01); C08G 63/60 (2013.01); G03G 9/08755 (2013.01)
USPC ...................................................... 430/109.4

(58) Field of Classification Search
CPC .................................................. G03G 9/08755
USPC ...................................................... 430/109.4
See application file for complete search history.

(56) References Cited

U.S. PATENT DOCUMENTS

| 2005/0018123 A1 | 1/2005 | Kaneko et al. |
| 2006/0018870 A1 | 1/2006 | Kuriyama et al. |
| 2008/0085461 A1 | 4/2008 | Kurokawa et al. |
| 2009/0162778 A1 | 6/2009 | Sasaki et al. |
| 2011/0091806 A1* | 4/2011 | Hayashi et al. .......... 430/137.15 |
| 2012/0021350 A1 | 1/2012 | Fukuri et al. |

FOREIGN PATENT DOCUMENTS

| JP | 54-53190 A | 4/1979 |
| JP | 7-199518 | 8/1995 |
| JP | 2004-250700 | 9/2004 |
| JP | 2006-063111 A | 3/2006 |
| JP | 2006-63316 | 3/2006 |
| JP | 2008-107759 | 5/2008 |
| JP | 2009-151101 | * 7/2009 |
| JP | 2011-100101 A | 5/2011 |

OTHER PUBLICATIONS

Combined Chinese Office Action and Search Report issued Dec. 24, 2012 in Patent Application No. 201080041604.0 with English Translation.
International Search Report issued Dec. 21, 2010 in PCT/JP2010/067228.
U.S. Appl. No. 13/498,471, filed Mar. 27, 2012, Fukuri, et al.
U.S. Appl. No. 13/499,309, filed Mar. 30, 2012, Kubo, et al.
Office Action issued Apr. 2, 2014 in Japanese Patent Application No. 2010-144734.
Office Action issued Apr. 10, 2014 in Japanese Patent Application No. 2010-177886.

* cited by examiner

Primary Examiner — Mark A Chapman
(74) Attorney, Agent, or Firm — Oblon, Spivak, McClelland, Maier & Neustadt, L.L.P.

(57) ABSTRACT

A polyester resin for a toner obtained by polycondensing a carboxylic acid component and an alcohol component, wherein the polyester resin for a toner is obtained using, as the carboxylic acid component and/or the alcohol component, a specified aromatic compound; a polyester resin for a toner obtained by polycondensing a reaction product obtained by treating a specified aromatic compound with a carboxylic acid having an unsaturated reactive group, a carboxylic acid component, and an alcohol component; a resin binder for a toner, containing the polyester resin for a toner; and a toner for electrophotography, containing the resin binder. The polyester resin for a toner of the present invention is suitably used for a resin binder of a toner used in developing and the like of latent images formed in electrophotography, electrostatic recording method, electrostatic printing method or the like.

15 Claims, No Drawings

POLYESTER RESIN FOR TONER

CROSS REFERENCE TO RELATED APPLICATION

This application is a 371 of PCT/JP2010/067228 filed on Oct. 1, 2010, and claims priority to the following Japanese Patent Applications: 2009-231747, filed on Oct. 5, 2009; 2010-144734, filed on Jun. 25, 2010; and 2010-177886, filed on Aug. 6, 2010.

TECHNICAL FIELD

The present invention relates to a polyester resin for a toner usable in developing latent images formed in, for example, electrophotography, an electrostatic recording method, an electrostatic printing method, or the like, a resin binder for a toner containing the polyester resin, and a toner for electrophotography containing the resin binder.

BACKGROUND ART

In recent years, with the advancements in speed-up and energy conservation of the machines, toners having excellent low-temperature fixing ability are in demand. As resin binders for toners, numerous polyesters having excellent low-temperature fixing ability are being studied, among which a polyester obtained by using, as a raw material monomer, a carboxylic acid having an aromatic ring capable of improving a glass transition temperature while maintaining a low softening point is being used.

Patent Publication 1 discloses, as an objective of providing a toner for electrostatic image development having a smaller amount of smaller size fine particles which are formed as a by-product during the polymerization of a toner, and further having a reduced residual amount of a degradation product of a polymerization initiator remaining in the toner, a method for producing a toner for electrostatic image development, including the steps of suspending a polymerizable monomer composition containing at least a polymerizable monomer and a colorant in an aqueous dispersion medium containing a dispersion stabilizer to provide a suspension dispersed with liquid droplets of the above-mentioned polymerizable monomer composition; and polymerizing the polymerizable monomers in the above suspension including subjecting the polymerizable monomers to a suspension polymerization in the presence of a polymerization initiator, to provide colored resin particles, wherein in the suspending step for providing the above suspension, an inhibitor for forming smaller size fine particles is contained in an aqueous dispersion medium in an amount of from 0.01 to 1 part by weight, based on 100 parts by weight of the polymerizable monomer, and the publication describes caffeic acid as an inhibitor for forming smaller size fine particles.

Patent Publication 2 discloses, as an objective of providing a method of deinking and regenerating an image-receiving sheet used in a method for forming fixed images according to electrophotography or the like, a microencapsulated toner characterized in that the microencapsulated toner comprises a core material having a colorant which is reversibly capable of developing color and removing color, and a shell material made of a shell forming resin for coating the core substance, and the publication describes coumaric acid as a colorant.

PRIOR ART REFERENCES

Patent Publications

Patent Publication 1: Japanese Patent Laid-Open No. 2008-107759

Patent Publication 2: Japanese Patent Laid-Open No. Hei-7-199518

SUMMARY OF THE INVENTION

Problems to be Solved by the Invention

However, a toner in which a polyester obtained from a carboxylic acid having an aromatic ring as a raw material monomer is used, has a disadvantage that triboelectric stability under high-temperature, high humidity conditions is lowered, so that it is desired that toners which meet the requirements for speed-up of the machines show improvements in triboelectric stability under high-temperature, high humidity conditions.

The present invention relates to a polyester resin for a toner, capable of improving triboelectric stability under high-temperature, high-humidity conditions, while maintaining low-temperature fixing ability and storage property of the toner, a resin binder containing the polyester resin, and a toner for electrophotography containing the resin binder.

The present invention relates to a polyester resin for a toner, capable of improving triboelectric stability under high-temperature, high-humidity conditions (hereinafter also simply referred to as "triboelectric stability"), while maintaining low-temperature fixing ability, storage property and durability of the toner, a resin binder containing the polyester resin, and a toner for electrophotography containing the resin binder.

Means to Solve the Problems

The present invention relates to:

[1] a polyester resin for a toner obtained by polycondensing a carboxylic acid component and an alcohol component, wherein the polyester resin for a toner is obtained using, as the above-mentioned carboxylic acid component and/or the above-mentioned alcohol component, an aromatic compound represented by the formula (Ia):

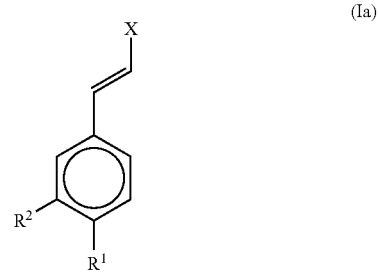

wherein each of $R^1$ and $R^2$ is independently a hydrogen atom or a hydroxyl group, and X is $-COOR^3$, wherein $R^3$ is a hydrogen atom or an alkyl group having 1 to 3 carbon atoms, or $-CH_2OH$, with proviso that a case where both of $R^1$ and $R^2$ are hydrogen atoms is excluded;

[2] a polyester resin for a toner obtained by polycondensing a reaction product obtained by treating an aromatic compound represented by the formula (Ib):

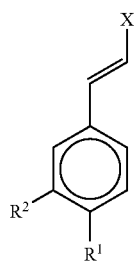

(Ib)

wherein each of $R^1$ and $R^2$ is independently a hydrogen atom or a hydroxyl group, and X is —COOR$^3$, wherein $R^3$ is a hydrogen atom or an alkyl group having 1 to 3 carbon atoms, or —CH$_2$OH, with a carboxylic acid having an unsaturated reactive group,
a carboxylic acid component, and
an alcohol component;
[3] a resin binder for a toner, containing the polyester resin for a toner as defined in the above [1] or [2]; and
[4] a toner for electrophotography, containing the resin binder as defined in the above [3].

Effects of the Invention

The polyester resin for a toner of the present invention exhibits some excellent effects, as a resin binder in a toner for electrophotography, of being capable of improving triboelectric stability under high-temperature, high-humidity conditions, while maintaining low-temperature fixing ability and storage property of the toner. In addition, a reaction product formed between a specified aromatic compound and a carboxylic acid having an unsaturated reactive group is used in a polyester resin for a toner, durability of the toner is further improved.

MODES FOR CARRYING OUT THE INVENTION

The polyester resin for a toner of the present invention has a feature in that the polyester resin is obtained from a specified aromatic compound having a vinylene group in the aromatic ring, and there are the following two embodiments (Embodiments A and B):
Embodiment A: A polyester resin for a toner, obtained by polycondensing a carboxylic acid component and an alcohol component, in which the polyester resin is obtained using, as the above-mentioned carboxylic acid component and/or the above-mentioned alcohol component, an aromatic compound represented by the formula (Ia):

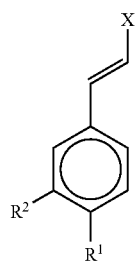

(Ia)

wherein each of $R^1$ and $R^2$ is independently a hydrogen atom or a hydroxyl group, and X is —COOR$^S$, wherein $R^3$ is a hydrogen atom or an alkyl group having 1 to 3 carbon atoms, or —CH$_2$OH, with proviso that a case where both of $R^1$ and $R^2$ are hydrogen atoms is excluded.
Embodiment B: A polyester resin for a toner, obtained by polycondensing
a reaction product obtained by treating an aromatic compound represented by the formula (Ib):

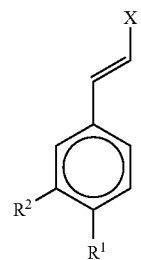

(Ib)

wherein each of $R^1$ and $R^2$ is independently a hydrogen atom or a hydroxyl group, and X is —COOR$^S$, wherein $R^3$ is a hydrogen atom or an alkyl group having 1 to 3 carbon atoms, or —CH$_2$OH, with a carboxylic acid having an unsaturated reactive group,
a carboxylic acid component, and
an alcohol component.

The polyester resin for a toner of the present invention also has excellent triboelectric stability under high-temperature, high-humidity conditions, while maintaining low-temperature fixing ability and storage property of the toner. Although the details of the reasons why such an excellent property is obtained are not elucidated, they are considered as follows. Since the aromatic compound used in the present invention has a vinylene group in the aromatic ring, it is possible to increase a glass transition temperature of a polyester obtained when used as a monomer for a polyester, while keeping its softening point low, and at the same time the aromatic ring is more likely to have resonance stability, thereby storing electrons in the aromatic ring, as compared to conventional aromatic carboxylic acid compounds such as terephthalic acid and isophthalic acid, whereby consequently remarkably improving triboelectric stability, especially triboelectric stability under high-temperature, high-humidity conditions.

First, the polyester resin of Embodiment A will be described.

The polyester resin of Embodiment A is represented by the formula (Ia):

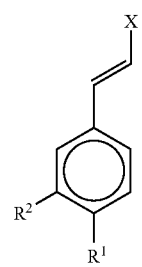

(Ia)

wherein each of $R^1$ and $R^2$ is independently a hydrogen atom or a hydroxyl group, and X is —COOR$^3$, wherein $R^3$ is a hydrogen atom or an alkyl group having 1 to 3 carbon atoms, or —CH$_2$OH, with proviso that a case where both of R$^1$ and R$^2$ are hydrogen atoms is excluded.

In the formula (Ia), R$^1$ is a hydrogen atom or a hydroxyl group, and it is preferable that R$^1$ is a hydroxyl group, from the viewpoint of resonance stability of the aromatic ring. In general, the reactivity of a hydroxyl group directly bonded to an aromatic ring is low; however, since the aromatic compound represented by the formula (Ia) is more likely to have resonance stability, it is considered that the reactivities of the hydroxyl groups of R$^1$ and R$^2$ would be high.

The aromatic compound represented by the formula (Ia) functions as either of the components of the carboxylic acid component and the alcohol component, as a raw material monomer for a polyester, depending upon the kinds of the functional groups, during the polycondensation. A hydroxycarboxylic acid is mainly polycondensed as a carboxylic acid component; therefore, in the present invention, for the sake of convenience, in a case where an aromatic compound is a hydroxycarboxylic acid in which X is a carboxyl group, i.e. X is —COOR$^3$, the aromatic compound would be regarded as a carboxylic acid component, and in a case where an aromatic compound is an alcohol in which X does not have a carboxyl group, i.e. X is —CH$_2$OH, the aromatic compound would be regarded as an alcohol component, which is used in calculation for the amount contained and the molar ratio accordingly.

In the aromatic compound represented by the formula (Ia), it is more preferable that the aromatic compound to be used as the carboxylic acid component is at least one of caffeic acid (X:—COOH, R$^1$: a hydroxyl group, and R$^2$: a hydroxyl group) and coumaric acid (X:—COOH, R$^1$: a hydroxyl group, and R$^2$: a hydrogen atom), from the viewpoint of triboelectric stability of the toner.

In addition, it is preferable that the aromatic compound to be used as the alcohol component is at least one of coumaryl alcohol (X: —CH$_2$OH, R$^1$: a hydroxyl group, and R$^2$: a hydrogen atom) and caffeyl alcohol (X: —COOH, R$^1$: a hydroxyl group, and R$^2$: a hydroxyl group), from the viewpoint of triboelectric stability of the toner.

In the polyester resin for a toner of Embodiment A, the aromatic compound represented by the formula (Ia) may be contained in either one, or both, of the carboxylic acid component and the alcohol component. It is preferable that the aromatic compound represented by the formula (Ia) contains at least one selected from coumaric acid and caffeic acid, and at least one selected from coumaryl alcohol and caffeyl alcohol, from the viewpoint of triboelectric stability of the toner.

The aromatic compound represented by the formula (Ia) is contained in an amount of preferably from 0.5 to 80% by mol, more preferably from 2.5 to 80% by mol, even more preferably from 2.5 to 60% by mol, still even more preferably from 5 to 50% by mol, still even more preferably from 7 to 25% by mol, and still even more preferably from 7 to 15% by mol, of a total amount of the carboxylic acid component and the alcohol component constituting the polyester resin, i.e. a total amount of the carboxylic acid component and the alcohol component used in the polycondensation reaction, from the viewpoint of triboelectric stability of the toner.

In addition, the aromatic compound represented by the formula (Ia) is contained in an amount of preferably from 0.5 to 80% by mol, more preferably from 2.5 to 80% by mol, even more preferably from 2.5 to 60% by mol, still even more preferably from 5 to 50% by mol, still even more preferably from 7 to 40% by mol, and still even more preferably from 7 to 25% by mol, of the carboxylic acid component constituting the polyester resin, i.e. the carboxylic acid component used in the polycondensation reaction, from the viewpoint of triboelectric stability of the toner. The aromatic compound represented by the formula (Ia) is contained in an amount of preferably from 0.5 to 80% by mol, more preferably from 2.5 to 80% by mol, even more preferably from 2.5 to 60% by mol, still even more preferably from 5 to 50% by mol, still even more preferably from 7 to 40% by mol, and still even more preferably from 7 to 25% by mol, of the alcohol component constituting the polyester resin, i.e. the alcohol component used in the polycondensation reaction, from the viewpoint of triboelectric stability of the toner.

The carboxylic acid component and the alcohol component used in the polyester resin for a toner of Embodiment A may contain a carboxylic acid compound and/or an alcohol other than the above-mentioned aromatic compound.

It is preferable that the alcohol other than the above-mentioned aromatic compound is an alkylene oxide adduct of bisphenol A, represented by the formula (II):

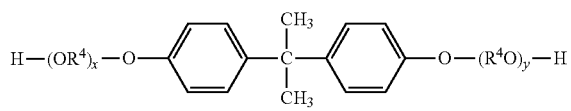

wherein R$^4$O and OR$^4$ are an oxyalkylene group, wherein R$^4$ is an ethylene and/or propylene group, x and y each shows the number of moles of the alkylene oxide added, each being a positive number, and the sum of x and y on average is preferably from 1 to 16, more preferably from 1 to 8, and even more preferably from 1.5 to 4, or
an aliphatic diol.

The alkylene oxide adduct of bisphenol A is preferred, from the viewpoint of storage property of the toner.

Specific examples of the alkylene oxide adduct of bisphenol A represented by the formula (II) include an alkylene oxide adduct of bisphenol A, such as a polyoxypropylene adduct of 2,2-bis(4-hydroxyphenyl)propane, and a polyoxyethylene adduct of 2,2-bis(4-hydroxyphenyl)propane.

The above-mentioned alkylene oxide adduct of bisphenol A is contained in an amount of preferably from 20 to 100% by mol, more preferably from 30 to 100% by mol, and even more preferably from 50 to 100% by mol, of the alcohol component, from the viewpoint of storage property of the toner.

In a case where the above-mentioned aromatic compound is used in a carboxylic acid component, the above-mentioned alkylene oxide adduct of bisphenol A is contained in an amount of preferably from 30 to 100% by mol, more preferably from 50 to 100% by mol, and even more preferably from 80 to 100% by mol, of the alcohol component, from the viewpoint of storage property of the toner.

In a case where the above-mentioned aromatic compound is used in an alcohol component, or in a case where the above-mentioned aromatic compound is used in both of an alcohol component and a carboxylic acid component, the above-mentioned alkylene oxide adduct of bisphenol A is contained in an amount of preferably from 0 to 90% by mol, more preferably from 20 to 90% by mol, and even more preferably from 30 to 85% by mol, of the alcohol component, from the viewpoint of storage property of the toner.

It is preferable that the aliphatic diol is an aliphatic diol having preferably 2 to 8 carbon atoms, and more preferably 2 to 6 carbon atoms, from the viewpoint of low-temperature fixing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, aliphatic diols having a hydroxyl group bound to a secondary carbon atom are preferred, from the viewpoint of being excellent in low-temperature fixing ability and storage stability of the toner.

The aliphatic diols have preferably 3 to 8 carbon atoms, and more preferably 3 to 6 carbon atoms, from the viewpoint of low-temperature fixing ability and storage property. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like.

The aliphatic diol is contained in an amount of preferably from 20 to 100% by mol, more preferably from 30 to 100% by mol, and even more preferably from 50 to 100% by mol, of the alcohol component, from the viewpoint of low-temperature fixing ability of the toner.

In a case where the above-mentioned aromatic compound is used as a carboxylic acid component, the above-mentioned aliphatic diol is contained in an amount of preferably from 30 to 100% by mol, more preferably from 50 to 90% by mol, and even more preferably from 80 to 100% by mol, of the alcohol component, from the viewpoint of low-temperature fixing ability of the toner.

In a case where the above-mentioned aromatic compound is used as an alcohol component, or in a case where the above-mentioned aromatic compound is used in both of an alcohol component and a carboxylic acid component, the above-mentioned aliphatic diol is contained in an amount of preferably from 0 to 90% by mol, more preferably from 20 to 90% by mol, and even more preferably from 30 to 85% by mol, of the alcohol component, from the viewpoint of low-temperature fixing ability of the toner.

As other alcohols, a trihydric or higher polyhydric alcohol such as glycerol, pentaerythritol, or trimethylolpropane may be used.

As a carboxylic acid component other than the above-mentioned aromatic compound, an aromatic dicarboxylic acid compound or an aliphatic dicarboxylic acid compound having 2 to 8 carbon atoms is preferred. In the present invention, carboxylic acids and derivatives such as acid anhydrides and alkyl(1 to 3 carbon atoms) esters are collectively referred to as the carboxylic acid compound.

An aromatic dicarboxylic acid compound such as phthalic acid, isophthalic acid, or terephthalic acid is preferred, from the viewpoint of low-temperature fixing ability and storage property of the toner.

The aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

In a case where the above-mentioned aromatic compound is used as a carboxylic acid component, or in a case where the above-mentioned aromatic compound is used in both of an alcohol component and a carboxylic acid component, the above-mentioned aromatic dicarboxylic acid compound is contained in an amount of preferably from 20 to 90% by mol, more preferably from 30 to 90% by mol, and even more preferably from 30 to 80% by mol, of the carboxylic acid component, from the viewpoint of low-temperature fixing ability and storage property of the toner.

In a case where the above-mentioned aromatic compound is used as an alcohol component, the above-mentioned aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

The aliphatic dicarboxylic acid compound, such as oxalic acid, malonic acid, maleic acid, fumaric acid, citraconic acid, itaconic acid, glutaconic acid, succinic acid, adipic acid, sebacic acid, or azelaic acid is preferred, from the viewpoint of the low-temperature fixing ability. The aliphatic dicarboxylic acid compound preferably has 2 to 10 carbon atoms, and more preferably has 3 to 9 carbon atoms.

In a case where the above-mentioned aromatic compound is used as a carboxylic acid component, or in a case where the above-mentioned aromatic compound is used in both of an alcohol component and a carboxylic acid component, the above-mentioned aromatic dicarboxylic acid compound is contained in an amount of preferably from 20 to 90% by mol, more preferably from 30 to 90% by mol, and even more preferably from 30 to 80% by mol, of the carboxylic acid component, from the viewpoint of low-temperature fixing ability of the toner.

In a case where the above-mentioned aromatic compound is used as an alcohol component, the above-mentioned aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability of the toner.

Other carboxylic acid compounds include alicyclic dicarboxylic acids such as cyclohexanedicarboxylic acid; tricarboxylic or higher polycarboxylic acids such as trimellitic acid and pyromellitic acid; rosins; rosins modified with fumaric acid, maleic acid, or acrylic acid; and the like.

In the present invention, it is desirable that the carboxylic acid component contains a tricarboxylic or higher polycarboxylic acid compound, preferably a trimellitic acid compound, and more preferably trimellitic anhydride, from the viewpoint of increasing molecular weight of the resin and increasing low-temperature fixing ability and storage property of the toner. The tricarboxylic or higher polycarboxylic acid compound is contained in an amount of preferably from 0.1 to 30% by mol, more preferably from 1 to 25% by mol, and even more preferably from 5 to 25% by mol, of the carboxylic acid component.

Here, the alcohol component may properly contain a monohydric alcohol, and the carboxylic acid component may properly contain a monocarboxylic acid compound, from the viewpoint of adjusting molecular weight of the resin and improving offset resistance.

The molar ratio of the carboxylic acid component to the alcohol component, i.e. the carboxylic acid component/the alcohol component, is preferably from 0.75 to 1.3, and more preferably from 0.8 to 1.3.

It is preferable that the polycondensation of the alcohol component and the carboxylic acid component is carried out at a temperature of from 160° to 250° C. in an inert gas atmosphere in the presence of an esterification catalyst such as a tin compound or a titanium compound, and the polycondensation reaction after the addition of the above-mentioned aromatic compound is carried out at preferably from 160° to 210° C., and more preferably from 170° to 200° C., from the viewpoint of reactivity and pyrolysis. More preferably, it is preferable that a dihydric alcohol component and a dicarboxylic acid component other than the above-mentioned aromatic compound are subjected to a polycondensation reaction, the above-mentioned aromatic compound is then added to a reaction mixture, and the polycondensation reaction is carried out at a temperature mentioned above, from the viewpoint of reactivity and pyrolysis.

As the tin compound, for example, dibutyltin oxide is known; however, in the present invention, tin(II) compounds without containing a Sn—C bond are preferred from the viewpoint of excellent dispersibility in the polyester.

As the tin(II) compound without containing a Sn—C bond, a tin(II) compound having a Sn—O bond, a tin(II) compound having a Sn—X bond, wherein X is a halogen atom, or the like is preferable, and the tin(II) compound having a Sn—O bond is more preferable.

The tin(II) compound having a Sn—O bond includes tin (II) carboxylates having a carboxylate group having 2 to 28 carbon atoms, such as tin(II) oxalate, tin(II) acetate, tin(II) octanoate, tin(II) 2-ethylhexanoate, tin(II) laurate, tin(II) stearate, and tin(II) oleate; alkoxy tin(II) compound having an alkoxy group having 2 to 28 carbon atoms, such as octyloxy tin(II), lauroxy tin(II), stearoxy tin(II), and oleyloxy tin(II); tin(II) oxide; tin(II) sulfate; and the like. The tin(II) having a Sn—X bond, wherein X is a halogen atom, includes tin(II) halides, such as tin(II) chloride and tin(II) bromide, and the like. Among them, a fatty acid tin(II) represented by $(R^5COO)_2Sn$, wherein $R^5$ is an alkyl group or an alkenyl group having 5 to 19 carbon atoms, an alkoxy tin(II) represented by $(R^6O)_2Sn$, wherein $R^6$ is an alkyl group or alkenyl group having 6 to 20 carbon atoms, and tin(II) oxide represented by SnO are preferable; the fatty acid tin(II) represented by $(R^5COO)_2Sn$ and tin oxide (II) are more preferable; tin(II) octanoate, tin(II) 2-ethylhexanoate, tin(II) stearate, and tin (II) oxide are even more preferable, from the viewpoint of triboelectric stability and catalytic ability.

Specific examples of the titanium compound include titanium diisopropylate bis(triethanolaminate) $[Ti(C_6H_{14}O_3N)_2(C_3H_7O)_2]$, titanium diisopropylate bis(diethanolaminate) $[Ti(C_4H_{10}O_2N)_2(C_3H_7O)_2]$, titanium dipentylate bis(triethanolaminate) $[Ti(C_6H_{14}O_3N)_2(C_5H_{11}O)_2]$, titanium diethylate bis(triethanolaminate) $[Ti(C_6H_{14}O_3N)_2(C_2H_5O)_2]$, titanium dihydroxyoctylate bis(triethanolaminate) $[Ti(C_6H_{14}O_3N)_2(OHC_8H_{16}O)_2]$, titanium distearate bis(triethanolaminate) $[Ti(C_6H_{14}O_3N)_2(C_{18}H_{37}O)_2]$, titanium triisopropylate triethanolaminate $[Ti(C_6H_{14}O_3N)(C_3H_7O)_3]$, titanium monopropylate tris(triethanolaminate) $[Ti(C_6H_{14}O_3N)_3(C_3H_7O)]$, and the like. Among them, titanium diisopropylate bis(triethanolaminate), titanium diisopropylate bis(diethanolaminate) and titanium dipentylate bis(triethanolaminate) are preferable, which are available as marketed products, for example, of Matsumoto Trading Co., Ltd.

Specific examples of other preferred titanium compounds include tetra-n-butyl titanate $[Ti(C_4H_9O)_4]$, tetrapropyl titanate $[Ti(C_3H_7O)_4]$, tetrastearyl titanate $[Ti(C_{18}H_{37}O)_4]$, tetramyristyl titanate $[Ti(C_{14}H_{29}O)_4]$, tetraoctyl titanate $[Ti(C_8H_{17}O)_4]$, dioctyl dihydroxyoctyl titanate $[Ti(C_8H_{17}O)_2(OHC_8H_{16}O)_2]$, dimyristyl dioctyl titanate $[Ti(C_{14}H_{29}O)_2(C_8H_{17}O)_2]$, and the like. Among them, tetrastearyl titanate, tetramyristyl titanate, tetraoctyl titanate and dioctyl dihydroxyoctyl titanate are preferable. These titanium compounds can be obtained by, for example, reacting a titanium halide with a corresponding alcohol, or are also available as marketed products of Nisso, or the like.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the alcohol component and the carboxylic acid component. Here, the amount of the esterification catalyst present means an entire formulation amount of the catalysts used in the polycondensation reaction.

In the present invention, it is preferable that a pyrogallol compound having a benzene ring of which three hydrogen atoms bound to carbon atoms adjacent to each other are substituted by hydroxyl groups is used together with an esterification catalyst, from the viewpoint of increasing reactivity of the aromatic compound used in the present invention and improving storage property of the toner.

The pyrogallol compound includes pyrogallol, pyrogallic acid, pyrogallic acid esters, benzophenone derivatives such as 2,3,4-trihydroxybenzophenone and 2,2',3,4-tetrahydroxybenzophenone, catechin derivatives such as epigallocatechin and epigallocatechin gallate, and the like. Among them, a compound represented by the formula (III):

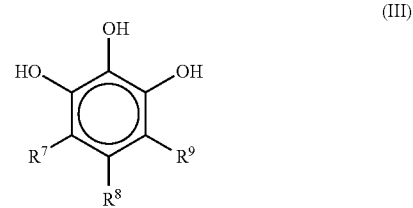

(III)

wherein each of $R^7$ to $R^9$ is independently a hydrogen atom or —$COOR^{10}$, wherein $R^{10}$ is a hydrogen atom or a hydrocarbon group having 1 to 12 carbon atoms, preferably an alkyl group having 1 to 12 carbon atoms or an alkenyl group having 2 to 12 carbon atoms, is preferable, from the viewpoint of durability of the resin obtained. In the formula, the hydrocarbon group of $R^{10}$ has preferably 1 to 8 carbon atoms, and more preferably 1 to 4 carbon atoms, from the viewpoint of reaction activity. Among the compounds represented by the formula (III), a compound where each of $R^7$ and $R^9$ is a hydrogen atom, and $R^8$ is a hydrogen atom or —$COOR^{10}$ is more preferable. Specific examples include pyrogallol ($R^7$ to $R^9$: hydrogen atoms), pyrogallic acid ($R^7$ and $R^9$: hydrogen atoms, $R^8$: —COOH), pyrogallic acid esters, such as ethyl pyrogallate ($R^7$ and $R^9$: hydrogen atoms, $R^8$: —$COOC_2H_5$), propyl pyrogallate ($R^7$ and $R^9$: hydrogen atoms, $R^8$: —$COOC_3H_7$), butyl pyrogallate ($R^7$ and $R^9$: hydrogen atoms, $R^8$: —$COOC_4H_9$), octyl pyrogallate ($R^7$ and $R^9$: hydrogen atoms, $R^8$: —$COOC_8H_{17}$), and lauryl pyrogallate ($R^7$ and $R^9$: hydrogen atoms, $R^8$: —$COOC_{12}H_{25}$), and the like. Pyrogallic acid and the pyrogallic acid esters are preferred from the viewpoint of storage property of the toner.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of the raw material monomers subjected to the polycondensation reaction, from the viewpoint of storage property of the toner. The amount of pyrogallol compound present as referred to herein means an entire formulation amount of pyrogallol compounds used in the polycondensation reaction.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of storage property of the toner.

The polyester resin of the present invention refers to a resin containing a polyester unit formed by polycondensation of an alcohol component and a carboxylic acid component, which includes not only polyesters but also polyester-polyamides and the like. Among them, the polyesters are preferred from the viewpoint of durability and triboelectric stability.

Here, the polyester may contain a polyester modified to an extent that the properties are not substantially impaired.

The modified resins of polyesters include, for instance, urethane-modified polyesters in which a polyester is modified with an urethane bond, epoxy-modified polyesters in which a polyester is modified with an epoxy bond, composite resins having two or more resin components including a polyester component and a vinyl resin component, and the like.

The composite resin containing a polyester component and a vinyl resin component may be produced by any of the methods, including, for example, a method including melt-kneading each of the resins in the presence of an initiator or the like as necessary, a method including dissolving each of the resins in a solvent, and mixing the solutions, and a method including polymerizing a mixture of raw material monomers for each of the resins. The composite resin is preferably a resin obtained by a polycondensation reaction and an addition polymerization reaction using the raw material monomers of the polyester component and the raw material monomers for the vinyl resin component mentioned above (JP-A-Hei-7-98518). Specifically, it is preferable that the composite resin is a hybrid resin obtained by further using, in addition to the raw materials monomers for a polycondensation resin and the raw material monomers for an addition polymerization resin, a compound capable of reacting with both of the raw material monomers for a polycondensation resin and the raw material monomers for an addition polymerization resin (dually reactive monomer), i.e. a resin in which a polycondensation resin and an addition polymerization resin are partially bonded via a dually reactive monomer. It is preferable that the dually reactive monomer is a compound having in its molecule an ethylenically unsaturated bond and at least one functional group selected from the group consisting of a hydroxyl group, a carboxyl group, an epoxy group, a primary amino group and a secondary amino group, preferably a hydroxyl group and/or a carboxyl group, and more preferably a carboxyl group. It is more preferable that the dually reactive monomer is acrylic acid, methacrylic acid, and fumaric acid.

The raw material monomers for a vinyl resin component includes styrenic compounds such as styrene and α-methylstyrene; ethylenically unsaturated monoolefins such as ethylene and propylene; diolefins such as butadiene; vinyl halides such as vinyl chloride; vinyl esters such as vinyl acetate and vinyl propionate; esters of ethylenic monocarboxylic acids such as alkyl(1 to 18 carbon atoms) esters of (meth)acrylic acid and dimethylaminoethyl (meth)acrylate; vinyl ethers such as vinyl methyl ether; vinylidene halides such as vinylidene chloride; N-vinyl compounds such as N-vinylpyrrolidone; and the like. Styrene, butyl acrylate, 2-ethylhexyl acrylate, and methyl methacrylate are preferable, from the viewpoint of reactivity, pulverizability and triboelectric stability. Styrene and/or an alkyl ester of (meth)acrylic acid is contained in an amount of preferably 50% by weight or more, and more preferably from 80 to 100% by weight of the vinyl resin component.

When the raw material monomers for a vinyl resin component are polymerized, a polymerization initiator, a crosslinking agent, or the like may be used, as necessary.

The weight ratio of the raw material monomers for a polyester component to the raw material monomers for a vinyl resin component, i.e. the raw material monomers for a polyester component/the raw material monomers for a vinyl resin component, is preferably from 55/45 to 95/5, more preferably from 60/40 to 95/5, and even more preferably from 70/30 to 90/10, from the viewpoint of forming the continuous matrix by the polyester component. Here, a dually reactive monomer is regarded as a raw material monomer of the polyester component.

The polyester resin of Embodiment A has a softening point of preferably from 90° to 160° C., more preferably from 100° to 150° C., and even more preferably from 105° to 145° C., from the viewpoint of fixing ability, storage property and durability of the toner.

In the polyester resin of Embodiment A, it is preferable to use both a resin having a higher softening point, i.e. a high-softening point resin, and a resin having a lower softening point, i.e. a low-softening point resin, from the viewpoint of low-temperature fixing ability, storage property, and triboelectric stability of the toner.

The difference in the softening points between the high-softening point resin and the low-softening point resin is preferably 10° C. or more, and more preferably from 20° to 60° C.

The high-softening point resin has a softening point of preferably from 125° to 160° C., and more preferably from 130° to 150° C., and the low-softening point resin has a softening point of preferably 90° C. or higher and lower than 125° C., and more preferably from 90° to 110° C. The weight ratio of the high-softening point resin to the low-softening point resin, i.e. high-softening point resin/low-softening point resin, is preferably from 1/3 to 3/1, and more preferably from 1/2 to 2/1.

The glass transition temperature is preferably from 45° to 85° C., and more preferably from 50° to 80° C., from the viewpoint of fixing ability, storage property and durability of the toner.

From the viewpoint of triboelectric stability, the acid value is preferably from 5 to 90 mgKOH/g, more preferably from 10 to 80 mgKOH/g, and even more preferably from 10 to 70 mgKOH/g, and the hydroxyl value is preferably from 1 to 80 mgKOH/g, more preferably from 8 to 60 mgKOH/g, and even more preferably from 8 to 55 mgKOH/g.

Next, the polyester resin of Embodiment B will be described.

The polyester resin of Embodiment B has a great feature in that the polyester resin is obtained by polycondensing, in addition to an alcohol component and a carboxylic acid component, a reaction product obtained by treating an aromatic compound represented by the formula (Ib):

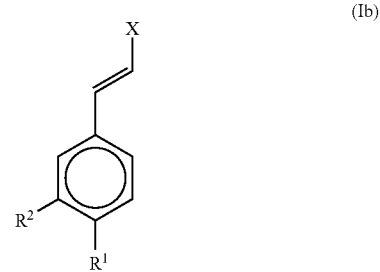

wherein each of Ie and R² is independently a hydrogen atom or a hydroxyl group, and X is —COOR$^S$, wherein R³ is a hydrogen atom or an alkyl group having 1 to 3 carbon atoms, or —CH$_2$OH,
with a carboxylic acid having an unsaturated reactive group. In Embodiment B, durability is also maintained, in addition to low-temperature fixing ability, storage property, and stability. This is presumably due to the fact that use of a reaction product obtained by treating the above-mentioned aromatic compound with a carboxylic acid compound having an unsaturated reactive group leads to an increase in reactivity of the polycondensation reaction of the above-mentioned aromatic compound than a case where the above-mentioned aromatic compound is directly subjected to a polycondensation reaction, thereby facilitating formation of the polyester resin having a higher molecular weight.

In the formula (Ib), R¹ is a hydrogen atom or a hydroxyl group, and it is preferable that R¹ is a hydroxyl group, from the viewpoint of triboelectric stability due to resonance stability of the aromatic ring. In general, a reactivity of a hydroxyl group directly bonded to the aromatic ring is low; however, it is considered that an aromatic compound represented by the formula (Ib) is more likely to have resonance stability, so that reactivities of R¹ and R² would be higher.

In the aromatic compound represented by the formula (Ib), the carboxylic acid is preferably at least one member selected from the group consisting of cinnamic acid (X: —COOH, R¹: a hydrogen atom, R²: a hydrogen atom), caffeic acid (X: —COOH, R¹: a hydroxyl group, R²: a hydroxyl group), and coumaric acid (X: —COOH, R¹: a hydroxyl group, R²: a hydrogen atom), from the viewpoint of triboelectric stability of the toner.

In the aromatic compound represented by the formula (Ib), the alcohol component is preferably at least one of coumaryl alcohol (X: —CH$_2$OH, a hydrogen atom, R²: a hydrogen atom) and caffeyl alcohol (X: —CH$_2$OH, R¹: a hydrogen atom, R²: a hydrogen atom), from the viewpoint of triboelectric stability of the toner.

The carboxylic acid having an unsaturated reactive group includes monocarboxylic acids, such as acrylic acid, methacrylic acid, and crotonic acid; and polycarboxylic acids, such as itaconic acid, maleic acid, fumaric acid, citraconic acid, and 2-methacryloyloxymethylsuccinic acid, and the carboxylic acid is preferably at least one member selected from the group consisting of (meth)acrylic acid, fumaric acid, and maleic acid, from the viewpoint of reactivity. These carboxylic acids may be used as an alkyl(1 to 8 carbon atoms) ester or an anhydride.

The reaction temperature during the reaction of the aromatic compound represented by the formula (Ib) and the carboxylic acid having an unsaturated reactive group is preferably from 140° to 210° C., and more preferably from 150° to 180° C. During the reaction, it is preferable that a polymerization inhibitor is used in order to prevent an addition reaction of the carboxylic acids themselves having an unsaturated reactive group. The mixing molar ratio of the aromatic compound represented by the formula (Ib) and the carboxylic acid having an unsaturated reactive group to be used in the reaction is preferably from 1/5 to 5/1, more preferably from 1/3 to 3/1, even more preferably from 1/2 to 2/1, and still even more preferably nearly equimolar, from the viewpoint of improving reactivity, and improving low-temperature fixing ability, storage property, and triboelectric stability, and durability of the toner.

From the viewpoint of reactivity, it is preferable that the aromatic compound represented by the formula (Ib) is thermally melted, and then reacted with the carboxylic acid having an unsaturated reactive group. A solvent may be properly used within the range that would not impair the effects of the present invention. The reaction time is preferably from 2 to 20 hours, and more preferably from 5 to 13 hours.

Considering that the addition reaction is a main reaction, the endpoint of reaction can be set so that in the molecular weight measurement according to GPC described later, a weight-average molecular weight is, as a rule of thumb, equal to or greater than a total molecular weight of the aromatic compound and the carboxylic acid having an unsaturated reactive group used. In general, a time point when a weight-average molecular weight according to GPC reaches 350 may be regarded as an endpoint of the addition reaction. The weight-average molecular weight of the reaction product obtained is preferably from 350 to 2,000, more preferably from 350 to 1,500, even more preferably from 350 to 1,000, and still even more preferably from 350 to 700, under the measurement conditions described below.

It is considered that a reaction product contains, as a main component, a product obtained by an addition reaction of the aromatic compound represented by the formula (Ib) and the carboxylic acid having an unsaturated reactive group. Specifically, in a case where the above-mentioned aromatic compound is a hydroxycarboxylic acid or a carboxylic acid, a main reaction product obtainable by an addition reaction of the aromatic compound and the carboxylic acid having an unsaturated reactive group is presumably a dicarboxylic or higher polycarboxylic acid having hydroxyl groups or a dicarboxylic or higher polycarboxylic acid. Also, in a case where the above-mentioned aromatic compound is an alcohol, the main reaction product obtainable by an addition reaction of the above-mentioned aromatic compound and the carboxylic acid having an unsaturated reactive group is presumably a hydroxycarboxylic acid or a dicarboxylic or higher polycarboxylic acid having hydroxyl groups. In the present invention, it is preferable that the reaction product contains a dicarboxylic or higher polycarboxylic acid compound, from the viewpoint of improvement in reactivity in the polycondensation reaction of the alcohol component and the carboxylic acid component, and durability and triboelectric stability of the toner.

It is preferable that the alcohol component used in Embodiment B is an alkylene oxide adduct of bisphenol A, represented by the formula (II):

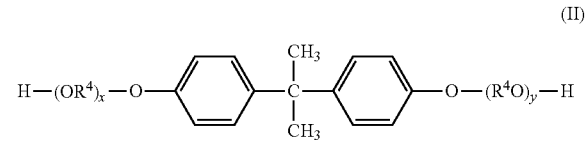

(II)

wherein R⁴O and OR⁴ are an oxyalkylene group, wherein R⁴ is an ethylene and/or propylene group, x and y each shows the number of moles of the alkylene oxide added, each being a positive number, and the sum of x and y on average is preferably from 1 to 16, more preferably from 1 to 8, and even more preferably from 1.5 to 4, and an aliphatic diol.

The alkylene oxide adduct of bisphenol A is preferred, from the viewpoint of storage property of the toner.

Specific examples of the alkylene oxide adduct of bisphenol A represented by the formula (II) include an alkylene oxide adduct of bisphenol A, such as a polyoxypropylene adduct of 2,2-bis(4-hydroxyphenyl)propane, and a polyoxyethylene adduct of 2,2-bis(4-hydroxyphenyl)propane.

The above-mentioned alkylene oxide adduct of bisphenol A is contained in an amount of preferably from 20 to 100% by mol, more preferably from 30 to 100% by mol, and even more preferably from 50 to 100% by mol, of the alcohol component, from the viewpoint of storage property of the toner.

It is preferable that the aliphatic diol is an aliphatic diol having preferably 2 to 8 carbon atoms, and more preferably 2 to 6 carbon atoms, from the viewpoint of low-temperature fixing ability of the toner.

The aliphatic diol includes ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, 1,4-butenediol, neopentyl glycol, 2,3-butanediol, 2,3-pentanediol, 2,4-pentanediol, 2,3-hexanediol, 3,4-hexanediol, 2,4-hexanediol, 2,5-hexanediol, and the like.

Among them, aliphatic diols having a hydroxyl group bound to a secondary carbon atom are preferred, from the viewpoint of being excellent in low-temperature fixing ability, storage stability, and triboelectric stability of the toner. The aliphatic diols have preferably 3 to 8 carbon atoms, and more preferably 3 to 6 carbon atoms, from the viewpoint of low-temperature fixing ability and storage property. Specific preferred examples include 1,2-propanediol, 1,2-butanediol, 1,3-butanediol, 2,3-butanediol, 1,2-pentanediol, 1,3-pentanediol, 2,3-pentanediol, 2,4-pentanediol, and the like.

The aliphatic diol is contained in an amount of preferably from 20 to 100% by mol, more preferably from 30 to 100% by mol, and even more preferably from 50 to 100% by mol, of the alcohol component, from the viewpoint of low-temperature fixing ability of the toner.

As the carboxylic acid component used in Embodiment B, an aromatic dicarboxylic acid compound or an aliphatic dicarboxylic acid compound having 2 to 8 carbon atoms is preferred. In the present invention, carboxylic acids and derivatives such as acid anhydrides and alkyl(1 to 3 carbon atoms) esters are collectively referred to as the carboxylic acid compound.

An aromatic dicarboxylic acid compound such as phthalic acid, isophthalic acid, or terephthalic acid is preferred, from the viewpoint of a balance between low-temperature fixing ability, storage property and triboelectric stability of the toner.

The aromatic dicarboxylic acid compound is contained in an amount of preferably from 20 to 100% by mol, more preferably from 30 to 90% by mol, and even more preferably from 40 to 80% by mol, of the carboxylic acid component, from the viewpoint of low-temperature fixing ability and storage property of the toner.

The aliphatic dicarboxylic acid compound, such as oxalic acid, malonic acid, maleic acid, fumaric acid, citraconic acid, itaconic acid, glutaconic acid, succinic acid, adipic acid, sebacic acid, or azelaic acid is preferred, from the viewpoint of the low-temperature fixing ability.

As other raw material monomers, it is preferable to use an aliphatic compound having a total number of hydroxyl groups and carboxyl groups of 3 or more and preferably 8 or less, from the viewpoint of high-temperature offset resistance and durability, and it is more preferable to use an aliphatic compound having a total number of hydroxyl groups and carboxyl groups of 4 or more and preferably 6 or less, from the viewpoint of reactivity. In addition, it is preferable that the aliphatic compound has one or more each of hydroxyl groups and carboxyl groups, from the viewpoint of durability of the toner.

Specific examples thereof include glycerol, pentaerythritol, trimethylolpropane, malic acid, tartaric acid, citric acid, pentaerythritol, and the like.

The aliphatic compound having a total number of hydroxyl groups and carboxyl groups of 3 or more is contained in an amount of preferably from 0.1 to 40% by mol, more preferably from 1 to 30% by mol, and even more preferably from 5 to 15% by mol, of the raw material monomers composed of the carboxylic acid component and the alcohol component, from the viewpoint of high-temperature offset resistance of the toner.

Further, it is desirable that the carboxylic acid component contains a tricarboxylic or higher polycarboxylic acid compound, preferably a trimellitic acid compound, and more preferably trimellitic anhydride, from the viewpoint of elevating molecular weight of the resin and increasing low-temperature fixing ability and storage property of the toner. The tricarboxylic or higher polycarboxylic acid compound is contained in an amount of preferably from 0.1 to 30% by mol, more preferably from 1 to 25% by mol, and even more preferably from 5 to 25% by mol, of the carboxylic acid component.

Here, the alcohol component may properly contain a monohydric alcohol, and the carboxylic acid component may properly contain a monocarboxylic acid compound, from the viewpoint of adjusting molecular weight of the resin and improving offset resistance of the toner.

The polyester resin for a toner of Embodiment B can be obtained by polycondensing a reaction product obtained by a reaction of an aromatic compound represented by the formula (Ib) and a carboxylic acid having an unsaturated reactive group, an alcohol component, and a carboxylic acid component.

The reaction product subjected to a polycondensation reaction of the carboxylic acid component and the alcohol component is used in an amount of preferably from 0.5 to 80 parts by weight, more preferably from 2.5 to 80 parts by weight, even more preferably from 5 to 50 parts by weight, still even more preferably from 5 to 30 parts by weight, and still even more preferably from 10 to 30 parts by weight, based on 100 parts by weight of a total amount of the carboxylic acid component and the alcohol component, from the viewpoint of low-temperature fixing ability, storage property, triboelectric stability and durability of the toner. Here, the carboxylic acid component or alcohol component used in the above calculation does not include a dually reactive monomer described later.

The molar ratio of the carboxylic acid component to the alcohol component, i.e. the carboxylic acid component/the alcohol component, is preferably from 0.5 to 1.3, and more preferably from 0.6 to 1.1.

It is preferable that the polycondensation reaction is carried out at a temperature of from 160° to 250° C. in an inert gas atmosphere in the presence of an esterification catalyst such as a tin compound or a titanium compound, and it is more preferable that the method is desirably a method including the steps of carrying out a polycondensation reaction of the carboxylic acid component and the alcohol component at preferably from 200° to 250° C., and more preferably from 210° to 240° C., thereafter adding the above-mentioned reaction product, and carrying out a polycondensation reaction at preferably from 160° to 210° C., and more preferably from 170° to 200° C., from the viewpoint of improving reactivity of the above-mentioned reaction product, improving triboelectric stability and durability, and also improving stability to decomposition.

The tin compound and the titanium compound include the same compounds as those in Embodiment A.

The esterification catalyst is present in an amount of preferably from 0.01 to 2.0 parts by weight, more preferably from 0.1 to 1.5 parts by weight, and even more preferably from 0.2 to 1.0 part by weight, based on 100 parts by weight of a total amount of the above-mentioned reaction product, the alcohol component and the carboxylic acid component. Here, the amount of the esterification catalyst present means an entire formulation amount of the catalysts used in the polycondensation reaction.

It is preferable to that a pyrogallol compound having a benzene ring of which three hydrogen atoms bound to carbon atoms adjacent to each other are substituted by hydroxyl groups is used as a promoter together with an esterification catalyst, from the viewpoint of increasing reactivity of the reaction product used in Embodiment B and improving storage property of the toner.

The pyrogallol compound includes the same compounds as those in Embodiment A.

The pyrogallol compound is present in the polycondensation reaction in an amount of preferably from 0.001 to 1.0 part by weight, more preferably from 0.005 to 0.4 parts by weight, and even more preferably from 0.01 to 0.2 parts by weight, based on 100 parts by weight of a total amount of the above-mentioned reaction product, the alcohol component and the carboxylic acid component subjected to the polycondensation reaction, from the viewpoint of storage property of the toner. The amount of pyrogallol compound present as referred to herein means an entire formulation amount of pyrogallol compounds used in the polycondensation reaction.

It is considered that the pyrogallol compound acts as a promoter for the esterification catalyst. The esterification catalyst used together with the pyrogallol compound is preferably at least one metal catalyst selected from the group consisting of tin compounds, titanium compounds, antimony trioxide, zinc acetate, and germanium dioxide.

The weight ratio of the pyrogallol compound to the esterification catalyst, i.e. the pyrogallol compound/the esterification catalyst, is preferably from 0.01 to 0.5, more preferably from 0.03 to 0.3, and even more preferably from 0.05 to 0.2, from the viewpoint of storage property of the toner.

The polyester resin of Embodiment B refers to a resin containing a polyester unit formed by polycondensation of the reaction product, an alcohol component and a carboxylic acid component.

Here, the polyester may contain a polyester modified to an extent that the properties are not substantially impaired.

The modified resins of polyesters include, for instance, polyester-polyamides, urethane-modified polyesters in which a polyester is modified with an urethane bond, epoxy-modified polyesters in which a polyester is modified with an epoxy bond, composite resins containing two or more resin components including a polyester component and a vinyl resin component, and the like.

The composite resin having a polyester component and a vinyl resin component is the same resin as that in Embodiment A.

The weight ratio of the raw material monomers (including the reaction product) of the polyester component to the raw material monomers for the vinyl resin component, i.e. the raw material monomers for polyester component/the raw material monomers for vinyl resin component, is preferably from 55/45 to 95/5, more preferably from 60/40 to 95/5, and even more preferably from 70/30 to 90/10, from the viewpoint of forming the continuous phase by the polyester component.

Here, a dually reactive monomer is regarded as a raw material monomer of the polyester component.

The polyester resin of Embodiment B has a softening point of preferably from 90° to 160° C., more preferably from 100° to 150° C., and even more preferably from 105° to 145° C., from the viewpoint of fixing ability, storage property and durability of the toner.

In a case where the polyester resin is used as a resin binder, it is preferable to use both a resin having a higher softening point and a resin having a lower softening point, from the viewpoint of low-temperature fixing ability and storage property of the toner. It is preferable that the resin binder comprises a high-softening point resin and a low-softening point resin, the softening points of which have a difference of preferably 10° C. or more, more preferably from 10° to 60° C., and even more preferably from 20° to 60° C. The high-softening point resin has a softening point of preferably from a temperature exceeding 120° C. and equal to or lower than 160° C., and more preferably from 125° to 150° C., and the low-softening point resin has a softening point of preferably from 90° to 120° C., and more preferably from 90° to 115° C. The weight ratio of the high-softening point resin to the low-softening point resin, i.e. high-softening point resin/low-softening point resin, is preferably from 1/3 to 3/1, and more preferably from 1/3 to 2/1. It is preferable that at least one of the high-softening point resin and the low-softening point resin is a polyester resin of the present invention, and it is more preferable that both the resins are polyester resins of the present invention.

The glass transition temperature is preferably from 45° to 85° C., and more preferably from 50° to 80° C., from the viewpoint of fixing ability, storage property and durability of the toner.

From the viewpoint of triboelectric stability of the toner, the acid value is preferably from 5 to 90 mgKOH/g, more preferably from 10 to 80 mgKOH/g, and even more preferably from 10 to 70 mgKOH/g, and the hydroxyl value is preferably from 1 to 80 mgKOH/g, more preferably from 8 to 60 mgKOH/g, and even more preferably from 8 to 55 mgKOH/g.

By using the polyester resin of the present invention as a resin binder, a toner for electrophotography having excellent triboelectric stability, while maintaining low-temperature fixing ability and storage property of the toner, is obtained.

In the toner of the present invention, a known resin binder, for example, other resins including a vinyl resin such as styrene-acrylic resin, an epoxy resin, a polycarbonate, or a polyurethane may be used together within the range that would not impair the effects of the present invention. The polyester resin of the present invention is contained in an amount of preferably 70% by weight or more, more preferably 80% by weight or more, even more preferably 90% by weight or more, and even more preferably essentially 100% by weight, of the resin binder.

The toner of the present invention may further properly contain an additive such as a colorant, a releasing agent, a charge control agent, a charge control resin, a magnetic powder, a fluidity improver, an electric conductivity modifier, an extender pigment, a reinforcing filler such as a fibrous material, an antioxidant, an anti-aging agent, or a cleanability improver.

As the colorant, all of the dyes, pigments and the like which are used as colorants for toners can be used, and carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow, and the like can be used. The toner of the present invention may be any of black toner and color toner. The colorant is contained in an amount of preferably from 1 to 40 parts by weight, and more preferably from 2 to 10 parts by weight, based on 100 parts by weight of the resin binder.

The releasing agent includes waxes including polyolefin waxes, paraffin waxes, and silicones; fatty acid amides, such as oleic acid amide, erucic acid amide, ricinoleic acid amide, and stearic acid amide; vegetable waxes, such as carnauba wax, rice wax, candelilla wax, wood wax, and jojoba oil; animal waxes, such as beeswax; and mineral and petroleum waxes, such as montan wax, ozokerite, ceresin, microcrystalline wax, and Fischer-Tropsch wax. These releasing agents can be used alone, or in a mixture of two or more kinds.

The releasing agent has a melting point of preferably from 60° to 160° C., and more preferably from 60° to 150° C., from the viewpoint of low-temperature fixing ability and offset resistance of the toner.

The releasing agent is contained in an amount of preferably from 0.5 to 10 parts by weight, more preferably from 1 to 8 parts by weight, and even more preferably from 1.5 to 7 parts by weight, based on 100 parts by weight of the resin binder, from the viewpoint of dispersibility of the releasing agent in the resin binder.

The charge control agent is not particularly limited, and the charge control agent may contain any one of positively chargeable charge control agents and negatively chargeable charge control agents.

The positively chargeable charge control agent includes Nigrosine dyes, for example, "Nigrosine Base EX," "Oil Black BS," "Oil Black SO," "BONTRON N-01," "BONTRON N-04," "BONTRON N-07," "BONTRON N-09," "BONTRON N-11" (hereinabove manufactured by Orient Chemical Co., Ltd.), and the like; triphenylmethane-based dyes containing a tertiary amine as a side chain; quaternary ammonium salt compounds, for example, "BONTRON P-51" (manufactured by Orient Chemical Co., Ltd.), cetyltrimethylammonium bromide, "COPY CHARGE PX VP435" (manufactured by Hoechst), and the like; polyamine resins, for example, "AFP-B" (manufactured by Orient Chemical Co., Ltd.), and the like; imidazole derivatives, for example, "PLZ-2001," "PLZ-8001" (hereinabove manufactured by SHIKOKU CHEMICAL CORPORATION), and the like.

In addition, the negatively chargeable charge control agent includes metal-containing azo dyes, for example, "VARI-FAST BLACK 3804," "BONTRON S-31" (hereinabove manufactured by Orient Chemical Co., Ltd.), "T-77" (manufactured by Hodogaya Chemical Co., Ltd.), "BONTRON S-32," "BONTRON S-34," "BONTRON S-36," (hereinabove manufactured by Orient Chemical Co., Ltd.), "AIZEN SPILON BLACK TRH" (manufactured by Hodogaya Chemical Co., Ltd.), and the like; metal compounds of benzilic acid compounds, for example, "LR-147," LR-297"(hereinabove manufactured by Japan Carlit, Ltd.), and the like; metal compounds of salicylic acid compounds, for example, "BONTRON E-81," "BONTRON E-84," "BONTRON E-88," "E-304" (hereinabove manufactured by Orient Chemical Co., Ltd.), and the like; "TN-105" (manufactured by Hodogaya Chemical Co., Ltd.); copper phthalocyanine dyes; quaternary ammonium salts, for example, "COPY CHARGE NX VP434" (manufactured by Hoechst), and the like; nitroimidazole derivatives; organometallic compounds, for example, "TN-105" (manufactured by Hodogaya Chemical Co., Ltd.); and the like.

The charge control agent is contained in an amount of preferably from 0.01 to 10 parts by weight, more preferably from 0.01 to 5 parts by weight, even more preferably from 0.3 to 3 parts by weight, still even more preferably from 0.5 to 3 parts by weight, and still even more preferably from 1 to 2 parts by weight, based on 100 parts by weight of the resin binder, from the viewpoint of triboelectric stability of the toner.

It is preferable that the toner of the present invention contains a charge control resin in order to improve triboelectric chargeability. The charge control resin is preferably a styrenic resin. A quaternary ammonium salt group-containing styrenic resin is preferred, from the viewpoint of exhibiting positive chargeability of the toner, and a sulfonic acid group-containing styrenic resin is preferred, from the viewpoint of exhibiting negative chargeability of the toner.

The quaternary ammonium salt group-containing styrenic resin is more preferably a quaternary ammonium salt group-containing styrene-acrylic resin obtained by the polymerization of a monomer mixture containing a monomer represented by the formula (IVa):

wherein $R^{11}$ is a hydrogen atom or a methyl group;
a monomer represented by the formula (IVb):

wherein $R^{12}$ is a hydrogen atom or a methyl group, and $R^{13}$ is an alkyl group having 1 to 12 carbon atoms; and
a monomer represented by the formula (IVc):

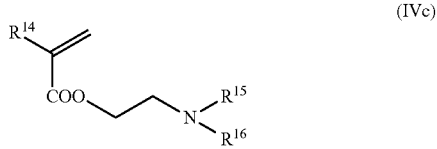

wherein $R^{14}$ is a hydrogen atom or a methyl group, and each of $R^{15}$ and $R^{16}$ is an alkyl group having 1 to 4 carbon atoms,
or a quaternary compound thereof. The monomers may be previously subjected to formation of quaternary compounds, or the formation of quaternary compounds may be carried out after the polymerization. A quaternary compound-forming agent includes alkyl halides such as methyl chloride and methyl iodide, diethyl sulfate, di-n-propyl sulfate, and the like.

The monomer represented by the formula (IVa) is preferably a styrene in which $R^{11}$ is a hydrogen atom, and the monomer represented by the formula (IVb) is a monomer in which $R^{12}$ is preferably a hydrogen atom and $R^{13}$ is an alkyl group having preferably from 1 to 6 carbon atoms, and more preferably from 1 to 4 carbon atoms. Specific examples of the monomer represented by the formula (IVb) include butyl acrylate, 2-ethylhexyl acrylate, and the like. It is desired that the monomer represented by the formula (IVc) is preferably a monomer in which $R^{14}$ is a methyl group, and $R^{15}$ and $R^{16}$ are a methyl group or an ethyl group, and that the monomer is more preferably dimethylaminoethyl methacrylate in which $R^{14}$, $R^{15}$ and $R^{16}$ are a methyl group, respectively.

In the quaternary ammonium salt group-containing styrenic resin, it is desirable that the monomer represented by the formula (IVa) is contained in an amount of preferably from 60 to 97% by weight, and more preferably from 70 to 90% by weight, of the monomer mixture, that the monomer represented by the formula (IVb) is contained in an amount of preferably from 1 to 33% by weight, and more preferably from 5 to 20% by weight, of the monomer mixture, and that the monomer represented by the formula (IVc) or a quaternary compound thereof is contained in an amount of preferably from 2 to 35% by weight, and more preferably from 5 to 20% by weight, of the monomer mixture.

Specific examples of the quaternary ammonium salt group-containing styrenic resin obtained from the monomers represented by the formulae (IVa) to (IVc) include butyl acrylate/ N,N-diethyl-N-methyl-2-(methacryloyloxy)ethyl ammonium/styrene copolymers, and the like.

It is preferable that the sulfonic acid group-containing styrenic resin is a sulfonic acid group-containing styrenic resin obtained by polymerizing a monomer mixture containing a monomer represented by the formula (IVa), a monomer represented by the formula (IVb), as mentioned above, and a sulfonic acid group-containing monomer.

The sulfonic acid group-containing monomer includes (meth)allylsulfonic acid, 2-(meth)acrylamide-2-methylpropanesulfonic acid, and styrenesulfonic acid. Specific examples of the sulfonic acid group-containing monomer include 2-ethylhexyl acrylate/2-acrylamide-2-methyl-1-propanesulfonic acid/styrene copolymers, and the like.

In the sulfonic acid group-containing styrenic resin, it is desirable that the monomer represented by the formula (IVa) is contained in an amount of preferably from 60 to 97% by weight, and more preferably from 70 to 90% by weight, that the monomer represented by the formula (IVb) is contained in an amount of preferably from 1 to 33% by weight, and more preferably from 5 to 20% by weight, and that the sulfonic acid group-containing monomer is contained in an amount of preferably from 2 to 35% by weight, and more preferably from 5 to 20% by weight, of the monomer mixture.

In both of the quaternary ammonium salt group-containing styrenic resin and the sulfonic acid group-containing styrenic resin, the polymerization of the monomer mixture can be carried out by, for example, heating a monomer mixture to 50° to 100° C. in an inert gas atmosphere in the presence of a polymerization initiator such as azobisdimethylvaleronitrile. Here, the polymerization method may be any of solution polymerization, suspension polymerization, or bulk polymerization, and preferably solution polymerization.

The styrenic resin has a softening point of preferably from 100° to 140° C., and more preferably from 110° to 130° C., from the viewpoint of low-temperature fixing ability of the toner.

The styrenic resin contained as a charge control resin is used in an amount of preferably from 3 to 40 parts by weight, more preferably from 4 to 30 parts by weight, and even more preferably from 5 to 20 parts by weight, based on 100 parts by weight of the resin binder, from the viewpoint of exhibiting triboelectric chargeability of the toner.

The toner of the present invention may be a toner obtained by any of conventionally known methods such as a melt-kneading method, an emulsion phase-inversion method, and a polymerization method, and a pulverized toner produced by the melt-kneading method is preferable, from the viewpoint of productivity and dispersibility of a colorant. In the case of a pulverized toner produced by a melt-kneading method, for example, a toner can be produced by homogeneously mixing raw materials such as a resin binder, a colorant, and a charge control agent, with a mixer such as a Henschel mixer, thereafter melt-kneading the mixture with a closed kneader, a single-screw or twin-screw extruder, an open roller-type kneader, or the like, cooling, pulverizing, and classifying the product. On the other hand, a toner produced by the polymerization method is preferable, from the viewpoint of forming a toner having a small particle size.

The toner of the present invention has a volume-median particle size ($D_{50}$) of preferably from 3 to 15 μm, and more preferably from 3 to 10 μm. Here, the volume-median particle size ($D_{50}$) as used herein means a particle size at 50% counting from smaller particle sizes in a cumulative volume frequency calculated in volume percentage.

In the toner of the present invention, it is preferable that fine inorganic particles are used as an external additive for improving transferablility. Specific examples preferably include one or more members selected from the group consisting of silica, alumina, titania, zirconia, tin oxide, and zinc oxide. Among them, silica is preferred, and it is more preferable to contain a silica having a small specific gravity, from the viewpoint of preventing embedment.

The silica is preferably a hydrophobic silica that is hydrophobically treated, from the viewpoint of transferability of the toner It is preferable that the method of subjecting silica to a hydrophobic treatment includes the step of modifying of a silanol group on the surface of the silica particles with a hydrophobic group such as an alkylsilyl group having 1 to 12 carbon atoms, for example, a methylsilyl group, a hexylsilyl group, or the like, or coating the surface with a hydrophobic resin.

The hydrophobic treatment agent for hydrophobically treating the surface of silica particles is exemplified by organochlorosilane, organoalkoxysilane, organodisilazane, cyclic organopolysilazane, linear organopolysiloxane and the like, and specifically include hexamethyldisilazane (HMDS), dimethyldichlorosilane (DMDS), a silicone oil, octyltriethoxysilane (OTES), methyltriethoxysilane, and the like. Among them, hexamethyldisilazane is preferred.

The external additive has an average particle size of preferably from 10 to 250 nm, more preferably from 10 to 200 nm, and even more preferably from 15 to 90 nm, from the viewpoint of triboelectric chargeability, flowability, and transferability of the toner.

The external additive is contained in an amount of preferably from 0.05 to 5 parts by weight, more preferably from 0.1 to 3 parts by weight, and even more preferably from 0.3 to 3 parts by weight, based on 100 parts by weight of the toner particles before the treatment with the external additive.

The toner of the present invention can be used as a toner for monocomponent development, or a two-component developer prepared by mixing the toner with a carrier.

EXAMPLES

[Softening Point of Resins]
The softening point refers to a temperature at which a half of the sample flows out, when plotting a downward movement of a plunger of a flow tester (Shimadzu Corporation, "CFT-500D"), against temperature, in which a sample is prepared by applying a load of 1.96 MPa thereto with the plunger using the flow tester and extruding a 1 g sample through a nozzle having a die pore size of 1 mm and a length of 1 mm, while heating the sample so as to raise the temperature at a rate of 6° C./min.

[Glass Transition Temperature of Resins]

The glass transition temperature refers to a temperature of an intersection of the extension of the baseline of equal to or lower than the temperature of the maximum endothermic peak and the tangential line showing the maximum inclination between the kick-off of the peak and the top of the peak, which is determined using a differential scanning calorimeter (manufactured by Seiko Instruments, Inc., "DSC 210") of a sample of which temperature is heated at a rate of 10° C./min., the sample prepared by measuring out a sample in an amount of from 0.01 to 0.02 g on an aluminum pan, raising its temperature to 200° C., and cooling the sample from that temperature to 0° C. at a cooling rate of 10° C./min.

[Acid Value of Resins]

The acid value is measured as prescribed by a method of JIS K0070, provided that only a measurement solvent is changed from a mixed solvent of ethanol and ether as prescribed in JIS K0070 to a mixed solvent of acetone and toluene (acetone:toluene=1:1 (volume ratio)).

[Hydroxyl Value of Resins]

The hydroxyl value is measured as prescribed by a method of JIS K0070.

[Melting Point of Releasing Agent]

A temperature of maximum endothermic peak obtained by raising the temperature of a sample at a rate of 10° C./min., the sample prepared by raising the temperature of a sample to 200° C. using a differential scanning calorimeter (manufactured by Seiko Instruments, Inc., "DSC 210"), and cooling the heated sample from that temperature to 0° C. at a cooling rate of 10° C./min., is referred to as a melting point.

[Average Particle Size of External Additive]

The average particle size refers to a number-average particle size, which is an average of particle sizes of 500 particles of the external additive, measured from a photograph taken with a scanning electron microscope (SEM). In a case where the particles have length and breath, it refers to the length.

[Volume-Median Particle Size ($D_{50}$) of Toner]

Measuring Apparatus: Coulter Multisizer II (manufactured by Beckman Coulter)

Aperture Diameter: 50 μm

Analyzing Software: Coulter Multisizer AccuComp Ver. 1.19 (manufactured by Beckman Coulter)

Electrolytic Solution: Isotone II (manufactured by Beckman Coulter)

Dispersion: A 5% electrolytic solution of EMULGEN 109P (manufactured by Kao Corporation, polyoxyethylene lauryl ether, HLB: 13.6).

Dispersion Conditions: Ten milligrams of a measurement sample is added to 5 ml of the above-mentioned dispersion, the mixture is dispersed for 1 minute with an ultrasonic disperser, and 25 ml of an electrolytic solution is added to the dispersion, and further dispersed with an ultrasonic disperser for 1 minute.

Measurement Conditions: The above-mentioned sample dispersion is added to 100 ml of the above-mentioned electrolytic solution in a beaker to adjust to a concentration at which particle sizes of 30,000 particles can be measured in 20 seconds, and thereafter the 30,000 particles are measured, and a volume-median particle size ($D_{50}$) is obtained from the particle size distribution.

Example 1

1.1 Production Example 1 of Resins [Resins A1 to A10]

A 5-liter four-neck flask equipped with a nitrogen inlet tube, a dehydration tube equipped with a fractional distillation tube through which hot water at 100° C. was allowed to flow, a stirrer, and a thermocouple was charged with an alcohol component other than an aromatic compound (Ia), terephthalic acid, and an esterification catalyst, as listed in Table 1-1 or 1-2, and the mixture was kept at 180° C. for 1 hour in a nitrogen atmosphere, heated from 180° to 230° C. at a rate of 10° C./hr, and then subjected to a polycondensation reaction at 230° C. for 10 hours. Further, the aromatic compound (Ia) as listed in Table 1-1 or 1-2 was added to the reaction mixture, and the mixture was subjected to a reaction thereat for 5 hour. Thereafter, trimellitic anhydride as listed in Table 1-1 or 1-2 was added thereto at 180° C., and the mixture was subjected to a reaction at 200° C., and subjected to a reaction at 10 kPa until a softening point as listed in Table 1-1 or 1-2 was reached, to provide each of polyesters.

1.2 Production Example 2 of Resins [Resins A11 to A12]

A 5-liter four-neck flask equipped with a dehydration tube equipped with a nitrogen inlet tube, a stirrer, and a thermocouple was charged with an alcohol component other than an aromatic compound (Ia), terephthalic acid, and an esterification catalyst, as listed in Table 1-2, and the mixture was subjected to a polycondensation reaction at 230° C. for 10 hours in a nitrogen atmosphere, and further subjected to a reaction at 230° C. and 8.0 kPa for 1 hour. Further, the aromatic compound (Ia) as listed in Table 1-2 was added to the reaction mixture at 180° C., and the mixture was subjected to a reaction thereat for 5 hours. Thereafter, trimellitic anhydride as listed in Table 1-2 was added thereto, and the mixture was subjected to a reaction at 200° C., and subjected to a reaction at 10 kPa until a softening point as listed in Table 1-2 was reached, to provide each of polyesters.

1.3 Production Example 3 of Resins [Resins A13 and A14]

A 5-liter four-neck flask equipped with a nitrogen inlet tube, a dehydration tube equipped with a fractional distillation tube through which hot water at 100° C. was allowed to flow, a stirrer, and a thermocouple was charged with an alcohol component, terephthalic acid, and an esterification catalyst, as listed in Table 1-3, and the mixture was kept at 180° C. for 1 hour in a nitrogen atmosphere, heated from 180° to 230° C. at a rate of 10° C./hr, and then subjected to a polycondensation reaction at 230° C. for 10 hours. Further, trimellitic anhydride as listed in Table 1-3 was added thereto, and the mixture was subjected to a reaction at 200° C., and subjected to a reaction at 10 kPa until a softening point as listed in Table 1-3 was reached, to provide each of polyesters.

1.4 Production Example 4 of Resins [Resins A15 and A16]

A 5-liter four-neck flask equipped with a dehydration tube equipped with a nitrogen inlet tube, a stirrer, and a thermocouple was charged with an alcohol component, terephthalic acid, and an esterification catalyst, as listed in Table 1-3, and the mixture was subjected to a polycondensation reaction at 230° C. for 10 hours in a nitrogen atmosphere, and further subjected to a reaction at 230° C. and 8.0 kPa for 1 hour. Further, trimellitic anhydride as listed in Table 1-3 was added thereto, and the mixture was subjected to a reaction at 200° C., and subjected to a reaction at 10 kPa until a softening point as listed in Table 1-3 was reached, to provide each of polyesters.

1.5 Production Example 5 of Resin [Resin H1]

A 5-liter four-neck flask equipped with a nitrogen inlet tube, a dehydration tube equipped with a fractional distillation tube through which hot water at 100° C. was allowed to flow, a stirrer, and a thermocouple was charged with raw material monomers of polyester other than trimellitic anhydride and an aromatic compound (Ia), and an esterification catalyst, as listed in Table 1-4, and the mixture was heated to 160° C. in a nitrogen atmosphere. Thereafter, a mixture of a dually reactive monomer, raw material monomers of a vinyl resin and a polymerization initiator as listed in Table 1-4 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. After cooling the reaction mixture to 180° C., the aromatic compound (Ia) as listed in Table 1-4 was added thereto at 180° C., and the mixture was subjected to a reaction threat for 5 hours. Finally, trimellitic anhydride as listed in Table 1-4 was added thereto, and the mixture was subjected to a reaction at 200° C. and 10 kPa until a softening point as listed in Table 1-4 was reached, to provide a hybrid resin.

1.6 Production Example 6 for Resin [Resin H2]

A 5-liter four-neck flask equipped with a dehydration tube equipped with a nitrogen inlet tube, a stirrer, and a thermocouple was charged with raw material monomers of polyester other than trimellitic anhydride and an aromatic compound (Ia), and an esterification catalyst, as listed in Table 1-4, and the mixture was heated to 160° C. in a nitrogen atmosphere. Thereafter, a mixture of a dually reactive monomer, raw material monomers of a vinyl resin and a polymerization initiator as listed in Table 1-4 was added dropwise thereto with a dropping funnel over 1 hour. After the dropwise addition, the addition polymerization reaction was matured for 1 hour, while keeping the mixture at 160° C. Thereafter, the mixture was subjected to a polycondensation reaction at 230° C. for 10 hours, and further subjected to a reaction at 230° C. and 8.0 kPa for 1 hour. Further, the aromatic compound (Ia) as listed in Table 1-4 was added thereto at 180° C., and the mixture was subjected to a reaction threat for 5 hours. Thereafter, trimellitic anhydride as listed in Table 1-4 was added thereto, and the mixture was subjected to a reaction at 200° C., and subjected to a reaction at 10 kPa until a softening point as listed in Table 1-4 was reached, to provide a hybrid resin.

TABLE 1

Table 1-1

| | Resin A1 Amount Used | | | Resin A2 Amount Used | | | Resin A3 Amount Used | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | 570 | 7.5 | 50 | 570 | 7.5 | 50 | 570 | 7.5 | 50 |
| 2,3-Butanediol | 675 | 7.5 | 50 | 675 | 7.5 | 50 | 540 | 6 | 40 |
| Aromatic Compound (Ia)[1)] | | | | | | | | | |
| Coumaryl Alcohol | — | — | — | — | — | — | 450 | 3 | 20 |
| Caffeyl Alcohol | — | — | — | — | — | — | — | — | — |
| Carboxylic Acid Component | | | | | | | | | |
| Terephthalic Acid | 1743 | 10.5 | 70 | 1743 | 10.5 | 70 | 1743 | 10.5 | 70 |
| Trimellitic Anhydride | 288 | 1.5 | 10 | 288 | 1.5 | 10 | 288 | 1.5 | 10 |
| Aromatic Compound (Ia)[1)] | | | | | | | | | |
| Coumaric Acid | 492 | 3 | 20 | — | — | — | — | — | — |
| Caffeic Acid | — | — | — | 540 | 3 | 20 | — | — | — |
| Esterification Catalyst (including promoter) | | | | | | | | | |
| Tin(II) 2-Ethylhexanoate | 18.8 | — | — | 19.1 | — | — | 18.0 | — | — |
| Pyrogallic Acid | 1.9 | — | — | 1.9 | — | — | 1.8 | — | — |
| Content[2)] of Aromatic Compound (Ia) (molar ratio) | | 10 | | | 10 | | | 11 | |
| Softening Point (° C.) | | 101.5 | | | 102.1 | | | 101.3 | |
| Glass Transition Temp. (° C.) | | 57.2 | | | 56.9 | | | 55.9 | |
| Acid Value (mgKOH/g) | | 25.4 | | | 24.9 | | | 25.1 | |
| Hydroxyl Value (mgKOH/g) | | 37.8 | | | 38.2 | | | 36.3 | |

TABLE 1-continued

| | Resin A4 Amount Used | | | Resin A5 Amount Used | | | Resin A6 Amount Used | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | 570 | 7.5 | 50 | 570 | 7.5 | 50 | 570 | 7.5 | 50 |
| 2,3-Butanediol | 540 | 6 | 40 | 675 | 7.5 | 50 | 675 | 7.5 | 50 |
| Aromatic Compound (Ia)[1] | | | | | | | | | |
| Coumaryl Alcohol | — | — | — | — | — | — | — | — | — |
| Caffeyl Alcohol | 498 | 3 | 20 | — | — | — | — | — | — |
| Carboxylic Acid Component | | | | | | | | | |
| Terephthalic Acid | 1743 | 10.5 | 70 | 1494 | 9 | 60 | 1618.5 | 9.75 | 65 |
| Trimellitic Anhydride | 288 | 1.5 | 10 | 288 | 1.5 | 10 | 288 | 1.5 | 10 |
| Aromatic Compound (Ia)[1] | | | | | | | | | |
| Coumaric Acid | — | — | — | 984 | 6 | 40 | 246 | 1.5 | 10 |
| Caffeic Acid | — | — | — | — | — | — | — | — | — |
| Esterification Catalyst (including promoter) | | | | | | | | | |
| Tin(II) 2-Ethylhexanoate | 18.2 | — | — | 20.1 | — | — | 17.0 | — | — |
| Pyrogallic Acid | 1.8 | — | — | 2.0 | — | — | 1.7 | — | — |
| Content[2] of Aromatic Compound (Ia) (molar ratio) | | 11 | | | 19 | | | 5 | |
| Softening Point (° C.) | | 100.8 | | | 102.4 | | | 102.3 | |
| Glass Transition Temp. (° C.) | | 56.2 | | | 54.3 | | | 58.3 | |
| Acid Value (mgKOH/g) | | 24.7 | | | 25.6 | | | 24.4 | |
| Hydroxyl Value (mgKOH/g) | | 37.9 | | | 36.7 | | | 36.8 | |

[1] Aromatic compound represented by the formula (Ia)
[2] Content of a total amount of the carboxylic acid component and the alcohol component

TABLE 2

Table 1-2

| | Resin A7 Amount Used | | | Resin A8 Amount Used | | | Resin A9 Amount Used | | |
|---|---|---|---|---|---|---|---|---|---|
| | g | mol | molar ratio | g | mol | molar ratio | g | mol | molar ratio |
| Alcohol Component | | | | | | | | | |
| 1,2-Propanediol | 570 | 7.5 | 50 | 570 | 7.5 | 50 | 570 | 7.5 | 50 |
| 2,3-Butanediol | 540 | 6 | 40 | 675 | 7.5 | 50 | 675 | 7.5 | 50 |
| BPA-PO[1] | — | — | — | — | — | — | — | — | — |
| BPA-EO[2] | — | — | — | — | — | — | — | — | — |
| Aromatic Compound (Ia)[3] | | | | | | | | | |
| Coumaryl Alcohol | 450 | 3 | 20 | — | — | — | — | — | — |
| Carboxylic Acid Component | | | | | | | | | |
| Terephthalic Acid | 1743 | 10.5 | 70 | 1743 | 10.5 | 70 | 1743 | 10.5 | 70 |
| Trimellitic Anhydride | 288 | 1.5 | 10 | 288 | 1.5 | 10 | 288 | 1.5 | 10 |
| Aromatic Compound (Ia)[3] | | | | | | | | | |
| Coumaric Acid | 492 | 3 | 20 | 246 | 1.5 | 10 | 492 | 3 | 20 |
| Caffeic Acid | — | — | — | 270 | 1.5 | 10 | — | — | — |
| Esterification Catalyst (including promoter) | | | | | | | | | |
| Tin(II) 2-Ethylhexanoate | 20.4 | — | — | 19 | — | — | — | — | — |
| Pyrogallic Acid | 2.0 | — | — | 1.9 | — | — | 1.9 | — | — |
| Titanium Catalyst[4] | — | — | — | — | — | — | 23.8 | — | — |
| Content[5] of Aromatic Compound (Ia)[3] (molar ratio) | | 19 | | | 10 | | | 10 | |
| Softening Point (° C.) | | 99.2 | | | 100 | | | 102.3 | |
| Glass Transition Temp. (° C.) | | 56.8 | | | 56.6 | | | 55.2 | |
| Acid Value (mgKOH/g) | | 26.1 | | | 24.8 | | | 24.1 | |
| Hydroxyl Value (mgKOH/g) | | 38.3 | | | 38.5 | | | 35.3 | |

TABLE 2-continued

|  | Resin A10 Amount Used | | | Resin A11 Amount Used | | | Resin A12 Amount Used | | |
| --- | --- | --- | --- | --- | --- | --- | --- | --- | --- |
|  | g | mol | molar ratio | g | mol | molar ratio | g | mol | molar ratio |
| Alcohol Component | | | | | | | | | |
| 1,2-Propanediol | 570 | 7.5 | 50 | — | — | — | — | — | — |
| 2,3-Butanediol | 675 | 7.5 | 50 | — | — | — | — | — | — |
| BPA-PO[1] | — | — | — | 1960 | 5.6 | 70 | 1960 | 5.6 | 70 |
| BPA-EO[2] | — | — | — | 780 | 2.4 | 30 | 780 | 2.4 | 30 |
| Aromatic Compound (Ia)[3] | | | | | | | | | |
| Coumaryl Alcohol | — | — | — | — | — | — | — | — | — |
| Carboxylic Acid Component | | | | | | | | | |
| Terephthalic Acid | 1743 | 10.5 | 70 | 929.6 | 5.6 | 70 | 929.6 | 5.6 | 70 |
| Trimellitic Anhydride | 576 | 3 | 20 | 153.6 | 0.8 | 10 | 307.2 | 1.6 | 20 |
| Aromatic Compound (Ia)[3] | | | | | | | | | |
| Coumaric Acid | 492 | 3 | 20 | 262.4 | 1.6 | 20 | 262.4 | 1.6 | 20 |
| Caffeic Acid | — | — | — | — | — | — | — | — | — |
| Esterification Catalyst (including promoter) | | | | | | | | | |
| Tin(II) 2-Ethylhexanoate | 20.3 | — | — | 20.4 | — | — | 21.2 | — | — |
| Pyrogallic Acid | 2.0 | — | — | 2.0 | — | — | 2.1 | — | — |
| Titanium Catalyst[4] | — | — | — | — | — | — | — | — | — |
| Content[5] of Aromatic Compound (Ia)[3] (molar ratio) | | 10 | | | 10 | | | 10 | |
| Softening Point (° C.) | | 138.6 | | | 100.8 | | | 139.2 | |
| Glass Transition Temp. (° C.) | | 67.9 | | | 58.1 | | | 66.3 | |
| Acid Value (mgKOH/g) | | 26.1 | | | 26.1 | | | 24.6 | |
| Hydroxyl Value (mgKOH/g) | | 34.9 | | | 38.2 | | | 35.6 | |

[1]Polyoxypropylene(2.2)-2,2-bis(4-hydroxyphenyl)propane
[2]Polyoxyethylene(2.0)-2,2-bis(4-hydroxyphenyl)propane
[3]Aromatic compound represented by the formula (Ia)
[4]Titanium diisopropylate bis(triethanolaminate)
[5]Content of a total amount of the carboxylic acid component and the alcohol component

TABLE 3

Table 1-3

|  | Resin A13 Amount Used | | | Resin A14 Amount Used | | | Resin A15 Amount Used | | | Resin A16 Amount Used | | |
| --- | --- | --- | --- | --- | --- | --- | --- | --- | --- | --- | --- | --- |
|  | g | mol | molar ratio | g | mol | molar ratio | g | mol | molar ratio | g | mol | molar ratio |
| Alcohol Component | | | | | | | | | | | | |
| 1,2-Propanediol | 570 | 7.5 | 50 | 570 | 7.5 | 50 | — | — | — | — | — | — |
| 2,3-Butanediol | 675 | 7.5 | 50 | 675 | 7.5 | 50 | — | — | — | — | — | — |
| BPA-PO[1] | — | — | — | — | — | — | 1960 | 5.6 | 70 | 1960 | 5.6 | 70 |
| BPA-EO[2] | — | — | — | — | — | — | 780 | 2.4 | 30 | 780 | 2.4 | 30 |
| Carboxylic Acid Component | | | | | | | | | | | | |
| Terephthalic Acid | 1743 | 10.5 | 70 | 1743 | 10.5 | 70 | 929.6 | 5.6 | 70 | 929.6 | 5.6 | 70 |
| Trimellitic Anhydride | 576 | 3 | 20 | 288 | 1.5 | 10 | 307.2 | 1.6 | 20 | 153.6 | 0.8 | 10 |
| Esterification Catalyst (including promoter) | | | | | | | | | | | | |
| Tin(II) 2-Ethylhexanoate | 17.8 | — | — | 16.4 | — | — | 19.9 | — | — | 19.1 | — | — |
| Pyrogallic Acid | 1.8 | — | — | 1.6 | — | — | 2.0 | — | — | 1.9 | — | — |
| Softening Point (° C.) | | 137.4 | | | 102.3 | | | 140.1 | | | 101.3 | |
| Glass Transition Temp. (° C.) | | 67.3 | | | 59.1 | | | 70.2 | | | 61.2 | |
| Acid Value (mgKOH/g) | | 24.6 | | | 25.1 | | | 23.8 | | | 24.6 | |
| Hydroxyl Value (mgKOH/g) | | 38.2 | | | 36.9 | | | 34.5 | | | 31 | |

[1]Polyoxypropylene(2.2)-2,2-bis(4-hydroxyphenyl)propane
[2]Polyoxyethylene(2.0)-2,2-bis(4-hydroxyphenyl)propane

TABLE 4

Table 1-4

| | Resin H1 Amount Used | | | Resin H2 Amount Used | | |
|---|---|---|---|---|---|---|
| | g | mol | ratio | g | mol | ratio |
| Raw Material Monomers of Polyester (P) Alcohol Component | | | molar ratio | | | molar ratio |
| 1,2-Propanediol | 456 | 6 | 50 | — | — | — |
| 2,3-Butanediol | 540 | 6 | 50 | — | — | — |
| BPA-PO[1)] | — | — | — | 1470 | 4.2 | 70 |
| BPA-EO[2)] | — | — | — | 585 | 1.8 | 30 |
| Carboxylic Acid Component | | | | | | |
| Terephthalic Acid | 1394 | 8.4 | 70 | 697 | 4.2 | 70 |
| Trimellitic Anhydride | 230 | 1.2 | 10 | 115 | 0.6 | 10 |
| Aromatic Compound (Ia)[3)] | | | | | | |
| Coumaric Acid | 394 | 2.4 | 20 | 197 | 1.2 | 20 |
| Esterification Catalyst (including promoter) | | | | | | |
| Tin(II) 2-Ethylhexanoate | 15.3 | — | — | 15.4 | — | — |
| Pyrogallic Acid | 1.5 | — | — | 1.5 | — | — |
| Dually Reactive Monomer | | | | | | |
| Acrylic Acid | 44.6 | 0.72 | 6 | 22.3 | 0.36 | 6 |
| Raw Material Monomers of Vinyl Resin (V) | | | weight ratio | | | weight ratio |
| Styrene | 642 | — | 84 | 648 | — | 84 |
| 2-Ethylhexyl Acrylate | 122 | — | 16 | 123 | — | 16 |
| Polymerization Initiator | | | weight ratio | | | weight ratio |
| Dibutyl Peroxide | 61.2 | — | 8 | 61.7 | — | 8 |
| Total Weight of P/Total Weight of V | | 4 | | | 4 | |
| Content[5)] of Aromatic Compound (Ia)[3)] (molar ratio) | | 10 | | | 10 | |
| Softening Point (° C.) | | 103 | | | 100.8 | |
| Glass Transition Temp. (° C.) | | 56.1 | | | 58.9 | |
| Acid Value (mgKOH/g) | | 26.3 | | | 26.1 | |
| Hydroxyl Value (mgKOH/g) | | 36.2 | | | 37.3 | |

[1)]Polyoxypropylene(2.2)-2,2-bis(4-hydroxyphenyl)propane
[2)]Polyoxyethylene(2.0)-2,2-bis(4-hydroxyphenyl)propane
[3)]Aromatic compound represented by the formula (Ia)
[4)]Weight ratio of the polymerization initiator is a weight ratio based on 100 parts by weight of the raw material monomers of a vinyl resin.
[5)]Content of a total amount of the carboxylic acid component and the alcohol component

1.7 Examples 1 to 21 and Comparative Examples 1 and 2

One hundred parts by weight of resin binders, a colorant, a charge control agent, a releasing agent, a charge control resin, only applicable to Example 19, 2.0 parts by weight, as listed in Table 1-5, were mixed with a Henschel mixer, and the mixture obtained was melt-kneaded with a twin-screw extruder. After cooling, the resulting melt-kneaded product was roughly pulverized to a size of about 1 mm with a hammer-mill. The resulting roughly pulverized product was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 μm.

To 100 parts by weight of the resulting toner particles was added an external additive as listed in Table 1-5, and the mixture was blended with a Henschel mixer, to provide each of the toners.

The raw materials listed in Table 1-5 are as follows.

[Colorant]
A: Black pigment "Regal 330R" (manufactured by Cabot Corporation), carbon black
B: Cyan pigment "ECB-301" (manufactured by DAINICHISEIKA COLOR & CHEMICALS MFG. CO.), Pigment Blue 15:3
C: Magenta pigment "Super Magenta R" (manufactured by DIC Corporation), Pigment Red 122
D: Yellow pigment "Paliotol Yellow D1155" (manufactured by BASF), Pigment Yellow 185

[Charge Control Agent]
A: Negatively chargeable charge control agent "BONTRON S-34" (manufactured by Orient Chemical Co. Ltd., azo metal compound)
B: Positively chargeable charge control agent "BONTRON N-04" (manufactured by Orient Chemical Co. Ltd.)
C: Negatively chargeable charge control agent "LR-147" (manufactured by Nippon Carlit, Ltd.)

[Releasing Agent]
A: Polypropylene wax "NP-105" (manufactured by MITSUI CHEMICALS, INC.), melting point: 140° C.

[Charge Control Resin]
A: "FCA-701PT" (manufactured by FUJIKURA KASEI CO., LTD.), positively chargeable charge control resin, quaternary ammonium salt group-containing styrene-acrylic copolymer, softening point: 123° C.

[External Additive]
A: "Aerosil R-972" (manufactured by Nippon Aerosil Co., Ltd.), average particle size: 16 nm, hydrophobic treatment agent: DMDS
B: Hydrophilic silica "TG-C243" (manufactured by Cabot Corporation), average particle size: 100 nm, hydrophobic treatment agents:
OTES+HMDS)

1.8 Test Example 1 [Low-Temperature Fixing Ability]

The resulting toner was loaded on a copy machine "AR-505" (manufactured by Sharp Corporation), of which fixing device was modified so that fixing could be carried out outside the machine, provided that the evaluation of Example 19 was made using a modified apparatus of nonmagnetic monocomponent development method printer "HL-2040" (manufactured by Brother Industries Ltd.), to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated in accordance with the following evaluation criteria. The results are shown in Table 1-5. Here, the paper used in the fixing test was CopyBond SF-70NA (75 g/m$^2$), manufactured by Sharp Corporation.

[Evaluation Criteria]
A: Lowest fixing temperature is lower than 150° C.
B: Lowest fixing temperature is 150° C. or higher and lower than 170° C.
C: Lowest fixing temperature is 170° C. or higher.

1.9 Test Example 2 [Storage Property]

Four grams of a toner was allowed to stand for 72 hours under environmental conditions of a temperature of 55° C. and relative humidity of 60%. After allowing the toner to stand, the extent of generation of toner aggregation was visually observed, and the storage property was evaluated in accordance with the following evaluation criteria. The results are shown in Table 1-5.

[Evaluation Criteria]
A: The aggregation is not found at all even after 72 hours.
B: Although the aggregation is not found after 48 hours, the aggregation is found after 72 hours.
C: The aggregation is found within 48 hours.

1.10 Test Example 3 [Triboelectric Stability under High-Temperature, High-Humidity Conditions]

A 50 ml polyethylene bottle was charged with 0.6 g of a toner and 19.4 g of a silicone ferrite carrier (manufactured by Kanto Denka Kogyo, average particle size: 90 μm), under the conditions of a temperature of 32° C. and a relative humidity of 85%, provided that in Example 19 a carrier was changed to a ferrite carrier ("P-01": standard product of Image Society of Japan, average particle size: 70 μm), and the components were mixed with a ball-mill at a rate of 250 r/min, and triboelectric charges of the toner were determined with a Q/M meter (manufactured by EPPING) in accordance with the following method.

After a given period of mixing time, a developer in defined amounts was supplied into a cell provided in the Q/M meter, and only the toner was aspirated for 90 seconds through a sieve having a sieve opening of 32 μm (made of stainless steel, twilled, wire diameter: 0.0035 mm). The voltage change generated on the carrier at this time was monitored, and a value for [a total electrical charge (μC) after 90 seconds)/amount (g) of toner aspirated] was defined as triboelectric charges (μC/g). A ratio between triboelectric charges after a mixing time of 180 seconds and triboelectric charges after a mixing time of 1,200 seconds, i.e. triboelectric charges after a mixing time of 1,200 seconds/triboelectric charges after a mixing time of 180 seconds, was calculated, and triboelectric stability was evaluated in accordance with the following evaluation criteria. The results are shown in Table 1-5.

[Evaluation Criteria]
A: 0.8 or more
B: 0.6 or more and less than 0.8
C: less than 0.6

TABLE 5

Table 1-5

| No. 1- | Resin Binder Resin L | Resin H | Mixing Ratio of Resins Resin L | Resin H | Content of Aromatic Compound (Ia) (% by mol) Resin L | Resin H | Colorant | Charge Control Agent | Releasing Agent | Charge Control Resin | External Additive | Low-Temp. Fixing Ability | Storage Property | Triboelectric Stability |
|---|---|---|---|---|---|---|---|---|---|---|---|---|---|---|
| Ex. 1 | A1 | A10 | 50 | 50 | A1(10) | A10(10) | A(5.0) | A(1.0) | A(2.0) | — | A(1.0) | A | A | A |
| Ex. 2 | A1 | A10 | 50 | 50 | A1(10) | A10(10) | B(6.0) | A(1.0) | A(2.0) | — | A(1.0) | A | A | A |
| Ex. 3 | A1 | A10 | 50 | 50 | A1(10) | A10(10) | C(6.0) | A(1.0) | A(2.0) | — | A(1.0) | A | A | A |
| Ex. 4 | A1 | A10 | 50 | 50 | A1(10) | A10(10) | D(6.0) | A(1.0) | A(2.0) | — | A(1.0) | A | A | A |
| Ex. 5 | A2 | A10 | 50 | 50 | A2(10) | A10(10) | A(5.0) | A(1.0) | A(2.0) | — | A(1.0) | A | A | A |
| Ex. 6 | A3 | A10 | 50 | 50 | A3(11) | A10(10) | A(5.0) | A(1.0) | A(2.0) | — | A(1.0) | A | A | A |
| Ex. 7 | A4 | A10 | 50 | 50 | A4(11) | A10(10) | A(5.0) | A(1.0) | A(2.0) | — | A(1.0) | A | A | A |
| Ex. 8 | A5 | A10 | 50 | 50 | A5(19) | A10(10) | A(5.0) | A(1.0) | A(2.0) | — | A(1.0) | B | B | A |
| Ex. 9 | A6 | A10 | 50 | 50 | A6(5) | A10(10) | A(5.0) | A(1.0) | A(2.0) | — | A(1.0) | A | A | B |
| Ex. 10 | A7 | A10 | 50 | 50 | A7(19) | A10(10) | A(5.0) | A(1.0) | A(2.0) | — | A(1.0) | A | A | A |
| Ex. 11 | A8 | A10 | 50 | 50 | A8(10) | A10(10) | A(5.0) | A(1.0) | A(2.0) | — | A(1.0) | A | A | A |

TABLE 5-continued

Table 1-5

| No. 1- | Resin Binder | | Mixing Ratio of Resins | | Content of Aromatic Compound (Ia) (% by mol) | | Colorant | Charge Control Agent | Releasing Agent | Charge Control Resin | External Additive | Low-Temp. Fixing Ability | Storage Property | Triboelectric Stability |
|---|---|---|---|---|---|---|---|---|---|---|---|---|---|---|
| | Resin L | Resin H | Resin L | Resin H | Resin L | Resin H | | | | | | | | |
| Ex. 12 | A9 | A10 | 50 | 50 | A9(10) | A10(10) | A(5.0) | A(1.0) | A(2.0) | — | A(1.0) | A | B | A |
| Ex. 13 | — | A10 | — | 100 | — | A10(10) | A(5.0) | A(1.0) | A(2.0) | — | A(1.0) | B | A | A |
| Ex. 14 | A11 | A12 | 50 | 50 | A11(10) | A12(10) | A(5.0) | A(1.0) | A(2.0) | — | A(1.0) | B | A | A |
| Ex. 15 | A1 | A13 | 50 | 50 | A1(10) | A13(0) | A(5.0) | A(1.0) | A(2.0) | — | A(1.0) | A | A | B |
| Ex. 16 | A1 | A15 | 50 | 50 | A1(10) | A15(0) | A(5.0) | A(1.0) | A(2.0) | — | A(1.0) | B | A | B |
| Ex. 17 | H1 | A10 | 50 | 50 | H1(10) | A10(10) | A(5.0) | A(1.0) | A(2.0) | — | A(1.0) | B | B | A |
| Ex. 18 | H2 | A10 | 50 | 50 | H2(10) | A10(10) | A(5.0) | A(1.0) | A(2.0) | — | A(1.0) | B | B | A |
| Ex. 19 | A1 | A10 | 50 | 50 | A1(10) | A10(10) | A(5.0) | B(1.0) | A(2.0) | A(5.0) | A(1.0) | B | A | A |
| Ex. 20 | A1 | A10 | 50 | 50 | A1(10) | A10(10) | A(5.0) | A(1.0) | A(2.0) | — | B(1.0) | B | A | A |
| Ex. 21 | A1 | A10 | 50 | 50 | A1(10) | A10(10) | A(5.0) | C(1.0) | A(2.0) | — | A(1.0) | B | A | A |
| Comp. Ex. 1 | A14 | A13 | 50 | 50 | A14(0) | A13(0) | A(5.0) | A(1.0) | A(2.0) | — | A(1.0) | A | A | C |
| Comp. Ex. 2 | A16 | A15 | 50 | 50 | A16(0) | A15(0) | A(5.0) | A(1.0) | A(2.0) | — | A(1.0) | B | A | C |

Remarks 1) In the resin binder, Resin L is a resin having a softening point of lower than 125° C., and Resin H is a resin having a softening point 125° C. or higher.
Remarks 2) The numerical values of the colorant, the charge control agent, the releasing agent, and the charge control resin are expressed by weight ratios based on 100 parts by weight of the resin binder. The numerical value of the external additive is expressed by a weight ratio based on 100 parts by weight of the toner particles before the treatment with the external additive.
Remarks 3) Amount of the aromatic compound represented by the formula (Ia) (% by mol) contained in a total amount of the carboxylic acid component and the alcohol component.

It can be seen from the above results that the toners of Examples 1-1 to 1-21 each containing as a resin binder obtained from a specific aromatic compound are favorable in both low-temperature fixing ability and storage property of the toner, and excellent in triboelectric stability under high-temperature, high-humidity conditions, as compared to the toners of Comparative Examples 1-1 and 1-2.

Example 2

[Weight-Average Molecular Weight of Reaction Product]

The weight-average molecular weight is obtained by measuring a molecular weight distribution in accordance with a gel permeation chromatography (GPC) method in accordance with the following method.

(1) Preparation of Sample Solution

A reaction product is dissolved in tetrahydrofuran so as to have a concentration of 0.5 g/100 ml. Next, this solution is filtered with a fluororesin filter (manufactured by Sumitomo Electric Industries, Ltd., FP-200) having a pore size of 2 μm, to remove an insoluble component, to provide a sample solution.

(2) Measurement of Molecular Weight

The measurement is taken by allowing tetrahydrofuran to flow through a column as an eluent at a flow rate of 1 ml per minute, stabilizing the column in a thermostat at 40° C., and loading 100 μl of a sample solution. The molecular weight of the sample is calculated based on the previously drawn calibration curve. At this time, a calibration curve is drawn from several kinds of monodisperse polystyrenes (manufactured by Tosoh Corporation, A-500 ($5.0 \times 10^2$), A-1000 ($1.01 \times 10^3$), A-2500 ($2.63 \times 10^3$), A-5000 ($5.97 \times 10^3$), F-1 ($1.02 \times 10^4$), F-2 ($1.81 \times 10^4$), F-4 ($3.97 \times 10^4$), F-10 ($9.64 \times 10^4$), F-20 ($1.90 \times 10^5$), F-40 ($4.27 \times 10^5$), F-80 ($7.06 \times 10^5$), and F-128 ($1.09 \times 10^6$)) as standard samples.

Measurement Apparatus: HLC-8220GPC (manufactured by Tosoh Corporation)
Analyzing Column: GMHLX+G3000HXL (manufactured by Tosoh Corporation)

2.1 Production Example of Reaction Products
[Reaction Products A to H]

A 5-liter four neck flask equipped with a dehydration tube equipped with a nitrogen inlet tube, a stirrer, and a thermocouple was charged with an aromatic compound, a carboxylic acid and a polymerization inhibitor, as listed in Table 2-1, and the mixture was subjected to a reaction at 160° C. for 10 hours in a nitrogen atmosphere. Thereafter, a weight-average molecular weight of the resulting reaction product was confirmed to be 350 or more.

TABLE 6

Table 2-1

| | Reaction Product A Amount Used | | Reaction Product B Amount Used | | Reaction Product C Amount Used | | Reaction Product D Amount Used | | Reaction Product E Amount Used | | Reaction Product F Amount Used | | Reaction Product G Amount Used | | Reaction Product H Amount Used | |
|---|---|---|---|---|---|---|---|---|---|---|---|---|---|---|---|---|
| | g | mol | g | mol | g | mol | g | mol | g | mol | g | mol | g | mol | g | mol |
| Aromatic Compound | | | | | | | | | | | | | | | | |
| Cinammic Acid | — | — | — | — | — | — | — | — | 1482 | 10 | — | — | 1482 | 10 | 1482 | 10 |
| Caffeic Acid | — | — | — | — | — | — | — | — | — | — | 1800 | 10 | — | — | — | — |
| Coumaric Acid | 1640 | 10 | 1640 | 10 | 1640 | 10 | — | — | — | — | — | — | — | — | — | — |

TABLE 6-continued

Table 2-1

| | Reaction Product A Amount Used | | Reaction Product B Amount Used | | Reaction Product C Amount Used | | Reaction Product D Amount Used | | Reaction Product E Amount Used | | Reaction Product F Amount Used | | Reaction Product G Amount Used | | Reaction Product H Amount Used | |
|---|---|---|---|---|---|---|---|---|---|---|---|---|---|---|---|---|
| | g | mol | g | mol | g | mol | g | mol | g | mol | g | mol | g | mol | g | mol |
| Methyl Coumarate Carboxylic Acid | — | — | — | — | — | — | 1780 | 10 | — | — | — | — | — | — | — | — |
| Acrylic Acid | 620 | 10 | — | — | — | — | 620 | 10 | 620 | 10 | 620 | 10 | 126 | 2 | 1860 | 30 |
| Fumaric Acid | — | — | 580 | 5 | — | — | — | — | — | — | — | — | — | — | — | — |
| Maleic Anhydride | — | — | — | — | 490 | 5 | — | — | — | — | — | — | — | — | — | — |
| Polymerization Inhibitor | | | | | | | | | | | | | | | | |
| tert-Butyl Catechol | 1.28 | — | 1.26 | — | 1.26 | — | 1.35 | — | 1.21 | — | 1.55 | — | 1.0 | — | 2.5 | — |
| Weight-Average Molecular Weight | 460 | | 720 | | 640 | | 480 | | 410 | | 480 | | 1020 | | 360 | |

2.2 Production Example 1 of Resins [Resins A1 to A14]

A 5-liter four neck flask equipped with a nitrogen inlet tube, a dehydration tube equipped with a fractional distillation tube through which hot water at 100° C. was allowed to flow, a stirrer, and a thermocouple was charged with an alcohol component, terephthalic acid and an esterification catalyst, as listed in Table 2-2 or 2-3, and the mixture was heated at 180° C. for 1 hour in a nitrogen atmosphere, then heated from 180° to 230° C. at a rate of 10° C./hr, and thereafter subjected to a polycondensation reaction at 230° C. for 10 hours. Further, a reaction product as listed in Table 2-2 or 2-3 was added thereto at 180° C., and the mixture was subjected to a reaction threat for 5 hours. Thereafter, trimellitic anhydride as listed in Table 2-2 or 2-3 was added thereto, and the mixture was subjected to a reaction at 200° C., and then subjected to a reaction at 10 kPa until a softening point as listed in Table 2-2 or 2-3 was reached, to provide each of polyesters.

2.3 Production Example 2 of Resin [Resin A15]

A 5-liter four neck flask equipped with a dehydration tube equipped with a nitrogen inlet tube, a stirrer, and a thermocouple was charged with an alcohol component, terephthalic acid and an esterification catalyst, as listed in Table 2-3, and the mixture was subjected to a polycondensation reaction at 230° C. for 10 hours in a nitrogen atmosphere, and further subjected to a reaction at 230° C. and 8.0 kPa for 1 hour. Further, a reaction product as listed in Table 2-3 was added thereto at 180° C., and the mixture was subjected to a reaction for 5 hours. Thereafter, trimellitic anhydride as listed in Table 2-3 was added thereto, and the mixture was subjected to a reaction at 200° C., and then subjected to a reaction at 10 kPa until a softening point as listed in Table 2-3 was reached, to provide a polyester.

2.4 Production Example 3 of Resin [Resin H1]

A 5-liter four neck flask equipped with a nitrogen inlet tube, a dehydration tube equipped with a fractional distillation tube through which hot water at 100° C. was allowed to flow, a stirrer, and a thermocouple was charged with raw material monomers of polyester other than trimellitic anhydride and a reaction product, and an esterification catalyst, as listed in Table 2-4, and the mixture was heated to 160° C. in a nitrogen atmosphere. Thereafter, a mixture of a dually reactive monomer (acrylic acid), raw material monomers of a styrenic resin and a polymerization initiator as listed in Table 2-4 was added dropwise thereto with a dropping funnel over 1 hour. After the dropwise addition, the addition polymerization reaction was matured for 1 hour, while keeping the mixture at 160° C., and the mixture was then subjected to a polycondensation reaction at 230° C. for 10 hours, and further subjected to a reaction at 230° C. and 8.0 kPa for 1 hour. After cooling the mixture to 180° C., a reaction product as listed in Table 2-4 was added thereto at 180° C., and the mixture was subjected to a reaction for 5 hours. Finally, trimellitic anhydride as listed in Table 2-4 was supplied thereto, and the mixture was subjected to a reaction at 200° C. and 10 kPa until a softening point as listed in Table 2-4 was reached, to provide a hybrid resin.

2.5 Production Example 4 of Resin [Resin H2]

A 5-liter four neck flask equipped with a dehydration tube equipped with a nitrogen inlet tube, a stirrer, and a thermocouple was charged with raw material monomers of polyester other than trimellitic anhydride and a reaction product, and an esterification catalyst, as listed in Table 2-4, and the mixture was heated to 160° C. in a nitrogen atmosphere. Thereafter, a mixture of a dually reactive monomer (acrylic acid), raw material monomers of a styrenic resin and a polymerization initiator as listed in Table 2-4 was added dropwise thereto with a dropping funnel over 1 hour. After the dropwise addition, the addition polymerization reaction was matured for 1 hour, while keeping the mixture at 160° C., and the mixture was then subjected to a polycondensation reaction at 230° C. for 10 hours, and further subjected to a reaction at 230° C. and 8.0 kPa for 1 hour. Further, the reaction product as listed in Table 2-4 was added thereto at 180° C., and the mixture was subjected to a reaction for 5 hours. Thereafter, trimellitic anhydride as listed in Table 2-4 was added thereto, and the mixture was subjected to a reaction at 200° C., and then subjected to a reaction at 10 kPa until a softening point as listed in Table 2-4 was reached, to provide a hybrid resin.

2.6 Production Example 5 of Resin [Resin B1]

A 5-liter four neck flask equipped with a nitrogen inlet tube, a dehydration tube equipped with a fractional distillation tube through which hot water at 100° C. was allowed to flow, a stirrer, and a thermocouple was charged with an alcohol component, terephthalic acid and an esterification catalyst, as listed in Table 2-5, and the mixture was heated at 180° C. for 1 hour in a nitrogen atmosphere, and then heated from 180° to 230° C. at a rate of 10° C./hr, and thereafter subjected to a polycondensation reaction at 230° C. for 10 hours. Further, trimellitic anhydride as listed in Table 2-5 was added thereto, and the mixture was subjected to a reaction at 200° C., and then subjected to a reaction at 10 kPa until a softening point as listed in Table 2-5 was reached, to provide a polyester.

2.7 Production Example 6 of Resin [Resin B2]

A 5-liter four neck flask equipped with a dehydration tube equipped with a nitrogen inlet tube, a stirrer, and a thermocouple was charged with an alcohol component, terephthalic acid and an esterification catalyst, as listed in Table 2-5, and the mixture was subjected to a polycondensation reaction at 230° C. for 10 hours in a nitrogen atmosphere, and further subjected to a reaction at 230° C. and 8.0 kPa for 1 hour. Further, trimellitic anhydride as listed in Table 2-5 was added thereto, and the mixture was subjected to a reaction at 200° C., and then subjected to a reaction at 10 kPa until a softening point as listed in Table 2-5 was reached, to provide a polyester.

TABLE 7

Table 2-2

| | Resin A1 Amount Used | | Resin A2 Amount Used | | Resin A3 Amount Used | | Resin A4 Amount Used | |
|---|---|---|---|---|---|---|---|---|
| | g | mol | g | mol | g | mol | g | mol |
| Alcohol Component | | | | | | | | |
| 1,2-Propanediol | 1140 | 15 | 1140 | 15 | 1140 | 15 | 1140 | 15 |
| 1,4-Butanediol | — | — | — | — | — | — | — | — |
| Carboxylic Acid Component | | | | | | | | |
| Terephthalic Acid | 1618.5 | 9.75 | 1618.5 | 9.75 | 1618.5 | 9.75 | 1618.5 | 9.75 |
| Trimellitic Anhydride | 374.4 | 1.95 | 374.4 | 1.95 | 374.4 | 1.95 | 374.4 | 1.95 |
| Reaction Product | A: 626.6 | — | B: 626.6 | — | C: 626.6 | — | D: 626.6 | — |
| Esterification Catalyst (including promoter) | | | | | | | | |
| Tin(II) 2-Ethylhexanoate | 15.7 | — | 15.7 | — | 15.7 | — | 10.6 | — |
| Pyrogallic acid | 1.6 | — | 1.6 | — | 1.6 | — | 1.6 | — |
| Titanium Catalyst A[1)] | — | — | — | — | — | — | — | — |
| Titanium Catalyst B[2)] | — | — | — | — | — | — | 2.3 | — |
| Reaction Product/(Alcohol Component + Carboxylic Acid Component) × 100 (Weight Ratio) | 20 | | 20 | | 20 | | 20 | |
| Softening Point (° C.) | 115.6 | | 110.8 | | 116.9 | | 111.5 | |
| Glass Transition Temp. (° C.) | 63.1 | | 61.8 | | 62.2 | | 61.1 | |
| Acid Value (mgKOH/g) | 25.4 | | 28.8 | | 29.2 | | 16.8 | |
| Hydroxyl Value (mgKOH/g) | 31.2 | | 36.5 | | 30.6 | | 29.8 | |

| | Resin A5 Amount Used | | Resin A6 Amount Used | | Resin A7 Amount Used | | Resin A8 Amount Used | |
|---|---|---|---|---|---|---|---|---|
| | g | mol | g | mol | g | mol | g | mol |
| Alcohol Component | | | | | | | | |
| 1,2-Propanediol | 1140 | 15 | 1140 | 15 | 1140 | 15 | 912 | 12 |
| 1,4-Butanediol | — | — | — | — | — | — | 270 | 3 |
| Carboxylic Acid Component | | | | | | | | |
| Terephthalic Acid | 1618.5 | 9.75 | 1618.5 | 9.75 | 1618.5 | 9.75 | 1618.5 | 9.75 |
| Trimellitic Anhydride | 374.4 | 1.95 | 374.4 | 1.95 | 374.4 | 1.95 | 374.4 | 1.95 |
| Reaction Product | E: 626.6 | — | F: 626.6 | — | G: 626.6 | — | H: 626.6 | — |
| Esterification Catalyst (including promoter) | | | | | | | | |
| Tin(II) 2-Ethylhexanoate | — | — | 15.7 | — | 15.7 | — | 15.7 | — |
| Pyrogallic acid | 1.6 | — | 1.6 | — | 1.6 | — | 1.6 | — |
| Titanium Catalyst A[1)] | — | — | — | — | — | — | — | — |
| Titanium Catalyst B[2)] | 15.7 | — | — | — | — | — | — | — |
| Reaction Product/(Alcohol Component + Carboxylic Acid Component) × 100 (Weight Ratio) | 20 | | 20 | | 20 | | 20 | |

TABLE 7-continued

| | | | | |
|---|---|---|---|---|
| Softening Point (° C.) | 103.8 | 122.2 | 108.2 | 123.4 |
| Glass Transition Temp. (° C.) | 58.1 | 62.9 | 57.7 | 55.8 |
| Acid Value (mgKOH/g) | 21.8 | 28.3 | 38.2 | 37.2 |
| Hydroxyl Value (mgKOH/g) | 26.9 | 15.6 | 25.6 | 9.4 |

[1)]Titanium diisopropylate bis(triethanolaminate)
[2)]Tetrabutyl titanate

TABLE 8

Table 2-3

| | Resin A9 Amount Used | | Resin A10 Amount Used | | Resin A11 Amount Used | | Resin A12 Amount Used | |
|---|---|---|---|---|---|---|---|---|
| | g | mol | g | mol | g | mol | g | mol |
| Alcohol Component | | | | | | | | |
| 1,2-Propanediol | — | — | 1140 | 15 | 570 | 7.5 | 1140 | 15 |
| 2,3-Butanediol | 1350 | 15 | — | — | 675 | 7.5 | — | — |
| 1,4-Butanediol | — | — | — | — | — | — | — | — |
| Glycerol | — | — | — | — | 184 | 2.0 | — | — |
| BPA-PO[1)] | — | — | — | — | — | — | — | — |
| BPA-EO[2)] | — | — | — | — | — | — | — | — |
| Carboxylic Acid Component | | | | | | | | |
| Terephthalic Acid | 1618.5 | 9.75 | 1618.5 | 9.75 | 2125 | 12.8 | 1618.5 | 9.75 |
| Trimellitic Anhydride | 374.4 | 1.95 | 374.4 | 1.95 | — | — | 374.4 | 1.95 |
| Reaction Product | A: 668.6 | — | A: 280 | — | A: 647.6 | — | A: 626.6 | — |
| Esterification Catalyst (including promoter) | | | | | | | | |
| Tin(II) 2-Ethylhexanoate | — | — | — | — | 16.2 | — | 15.7 | — |
| Pyrogallic acid | 1.7 | — | 1.6 | — | 1.6 | — | 1.6 | — |
| Titanium Catalyst A[3)] | — | — | 15.7 | — | — | — | — | — |
| Titanium Catalyst B[4)] | 15.7 | — | — | — | — | — | — | — |
| Reaction Product/(Alcohol Component + Carboxylic Acid Component) × 100 (Weight Ratio) | 20 | | 8.9 | | 18.2 | | 20 | |
| Softening Point (° C.) | 125.2 | | 100.6 | | 115.4 | | 93.8 | |
| Glass Transition Temp. (° C.) | 66.8 | | 56.8 | | 63.2 | | 52.3 | |
| Acid Value (mgKOH/g) | 23.2 | | 33.9 | | 18.9 | | 45.6 | |
| Hydroxyl Value (mgKOH/g) | 28.1 | | 40.2 | | 39.9 | | 48.3 | |

| | Resin A13 Amount Used | | Resin A14 Amount Used | | Resin A15 Amount Used | |
|---|---|---|---|---|---|---|
| | g | mol | g | mol | g | mol |
| Alcohol Component | | | | | | |
| 1,2-Propanediol | 912 | 12 | 1140 | 15 | — | — |
| 2,3-Butanediol | 180 | 2 | — | — | — | — |
| 1,4-Butanediol | 90 | 1 | — | — | — | — |
| Glycerol | — | — | — | — | — | — |
| BPA-PO[1)] | — | — | — | — | 1225 | 3.5 |
| BPA-EO[2)] | — | — | — | — | 487.5 | 1.5 |
| Carboxylic Acid Component | | | | | | |
| Terephthalic Acid | 1618.5 | 9.75 | 1618.5 | 9.75 | 539.5 | 3.25 |
| Trimellitic Anhydride | 374.4 | 1.95 | 374.4 | 1.95 | 124.8 | 0.65 |
| Reaction Product | A: 626.6 | — | A: 1253.2 | — | A: 475.4 | — |
| Esterification Catalyst (including promoter) | | | | | | |
| Tin(II) 2-Ethylhexanoate | 15.7 | — | 15.7 | — | 11.9 | — |
| Pyrogallic acid | 1.6 | — | 1.6 | — | 1.2 | — |
| Titanium Catalyst A[3)] | — | — | — | — | — | — |
| Titanium Catalyst B[4)] | — | — | — | — | — | — |
| Reaction Product/(Alcohol Component + Carboxylic Acid Component) × 100 (Weight Ratio) | 20 | | 40 | | 20 | |
| Softening Point (° C.) | 138.2 | | 112.3 | | 109.3 | |
| Glass Transition Temp. (° C.) | 69.1 | | 60.1 | | 62.8 | |

TABLE 8-continued

| | | | |
|---|---|---|---|
| Acid Value (mgKOH/g) | 19.2 | 31.9 | 18.5 |
| Hydroxyl Value (mgKOH/g) | 21.0 | 38.6 | 33.1 |

[1] Polyoxypropylene(2.2)-2,2-bis(4-hydroxyphenyl)propane
[2] Polyoxyethylene(2.2)-2,2-bis(4-hydroxyphenyl)propane
[3] Titanium diisopropylate bis(triethanolaminate)
[4] Tetrabutyl titanate

TABLE 9

Table 2-4

| | Resin H1 Amount Used | | Resin H2 Amount Used | |
|---|---|---|---|---|
| | g | mol | g | mol |
| Raw Material Monomers for Polyester (PES) Alcohol Component | | | | |
| 1,2-Propanediol | 1064 | 14 | — | — |
| 1,3-Propanediol | 76 | 1 | — | — |
| BPA-PO[1] | — | — | 1225 | 3.5 |
| BPA-EO[2] | — | — | 487.5 | 1.5 |
| Carboxylic Acid Component | | | | |
| Terephthalic Acid | 1618.5 | 9.75 | 539.5 | 3.25 |
| Trimellitic Anhydride | 374.4 | 1.95 | 124.8 | 0.65 |
| Reaction Product | A: 626.6 | — | A: 280.3 | — |
| Esterification Catalyst (including promoter) | | | | |
| Pyrogallic Acid | 1.6 | — | 1.2 | — |
| Tin(II) 2-Ethylhexanoate | 15.7 | — | 11.9 | — |
| Dually Reactive Monomer | | | | |
| Acrylic Acid | 55.8 | 0.9 | 18.6 | 0.3 |
| Raw Material Monomers for Styrenic Resin (St) | | | | |
| Styrene | 657.9 | — | 600 | — |
| 2-Ethylhexyl Acrylate | 125.3 | — | 118 | — |
| Reaction Product/(Alcohol Component + Carboxylic Acid Component) × 100 (Weight Ratio) | 20 | | 8.9 | |
| Total Amount of PES/Total Amount of St (weight ratio) | 4.8 | | 3.7 | |
| Softening Point (° C.) | 122.2 | | 108.9 | |
| Glass Transition Temp. (° C.) | 61.2 | | 58.5 | |
| Acid Value (mgKOH/g) | 19.8 | | 26.5 | |
| Hydroxyl Value (mgKOH/g) | 30.4 | | 32.2 | |

[1] Polyoxypropylene(2.2)-2,2-bis(4-hydroxyphenyl)propane
[2] Polyoxyethylene(2.2)-2,2-bis(4-hydroxyphenyl)propane

TABLE 10

Table 2-5

| | Resin B1 Amount Used | | Resin B2 Amount Used | |
|---|---|---|---|---|
| | g | mol | g | mol |
| Alcohol Component | | | | |
| 1,2-Propanediol | 1140 | 15 | — | — |
| BPA-PO[1] | — | — | 1400 | 4 |
| BPA-EO[2] | — | — | 650 | 2 |
| Carboxylic Acid Component | | | | |
| Terephthalic Acid | 1800 | 10.84 | 772 | 4.65 |
| Trimellitic Anhydride | 500 | 2.60 | 96 | 0.50 |
| Esterification Catalyst (including promoter) | | | | |
| Tin(II) 2-Ethylhexanoate | 11.9 | — | 11.9 | — |
| Pyrogallic Acid | 1.2 | — | 1.2 | — |
| Softening Point (° C.) | 122.6 | | 109.3 | |
| Glass Transition Temp. (° C.) | 65.3 | | 60.8 | |
| Acid Value (mgKOH/g) | 32.3 | | 11.5 | |
| Hydroxyl Value (mgKOH/g) | 33.1 | | 33.1 | |

[1] Polyoxypropylene(2.2)-2,2-bis(4-hydroxyphenyl)propane
[2] Polyoxyethylene(2.2)-2,2-bis(4-hydroxyphenyl)propane

2.8 Examples 1 to 8 and 12 to 19 and Comparative Examples 1 and 2

One hundred parts by weight of a resin binder as listed in Table 2-6, 1 part by weight of a negatively chargeable charge control agent "BONTRON S-34" (manufactured by Orient Chemical Co., Ltd., azo metallic compound), 4.0 parts by weight of a colorant "Regal 330R" (manufactured by Cabot Corporation, carbon black), and 2.0 parts by weight of a polypropylene wax "NP-105" (manufactured by MITSUI CHEMICALS, INC.: melting point 140° C.) were mixed with a Henschel mixer. The mixture obtained was melt-kneaded with a twin-screw extruder. After cooling, the resulting melt-kneaded product was roughly pulverized to a size of 1 mm or so with a hammer mill. The resulting roughly pulverized product was finely pulverized with an air jet-type pulverizer (IDS-2 Model, manufactured by Nippon Pneumatic Mfg. Co., Ltd.), and classified, to provide toner particles having a volume-median particle size ($D_{50}$) of 7.5 µm.

To 100 parts by weight of the resulting toner particles was added 1.0 part by weight of an external additive hydrophobic silica "Aerosil R-972" (manufactured by Nippon Aerosil Co., Ltd., average particle size: 16 nm, hydrophobic treatment agent: dimethyldichlorosilane), and the mixture was blended with a Henschel mixer, to provide each of the toners.

2.9 Examples 9 to 11

The same procedures as in Example 1 were carried out except that 1 part by weight of "LR-147" (manufactured by Nippon Carlit, Ltd., boron complex of benzilic acid compound) was used in place of "BONTRON S-34" (manufactured by Orient Chemical Co., Ltd.) as a negatively chargeable charge control agent, and that 6 parts by weight of a yellow pigment "Paliotol Yellow D1155" (manufactured by BASF, P.Y. 185) in Example 9, 6 parts by weight of a magenta pigment "Super Magenta R" (manufactured by DIC Corporation, P.R. 122) in Example 10, or 6 parts by weight of a cyan pigment "Toner Cyan BG" (manufactured by Clariant GmbH, C.I. Pigment Blue 15:3) in Example 11 was used in place of the carbon black "Regal 330R" as a colorant, to provide each of toners.

2.10 Example 20

The same procedures as in Example 1 were carried out except that 7 parts by weight of a charge control resin "FCA-701PT" (manufactured by FUJIKURA KASEI CO., LTD., quaternary ammonium salt group-containing styrene-acrylic copolymer, softening point: 123° C.) was used together with a resin binder, a colorant and the like, to provide a toner.

2.11 Example 21

The same procedures as in Example 1 were carried out except that 1.0 part by weight of a hydrophobic silica "TG-C243" (manufactured by Cabot Corporation, average particle size: 100 nm, hydrophobic treatment agents: hexamethyldisilazane and (+) octyltriethoxysilane) was used in place of "Aerosil R-972" as an external additive, to provide a toner.

2.12 Example 22

The same procedures as in Example 1 were carried out except that 1 part by weight of "BONTRON E-84" (manufactured by Orient Chemical Co., Ltd., metal compound of salicylic acid) was used in place of "BONTRON S-34" (manufactured by Orient Chemical Co., Ltd.) as a negatively chargeable charge control agent, to provide a toner.

2.13 Test Example 1 [Low-Temperature Fixing Ability]

A toner was loaded on a copy machine "AR-505" (manufactured by Sharp Corporation), of which fixing device was modified so that fixing could be carried out outside the machine, provided that the evaluation of Example 20 was made using a modified apparatus of nonmagnetic monocomponent development method printer "HL-2040" (manufactured by Brother Industries Ltd.), to provide unfixed images. While sequentially raising the temperature of a fixing roller from 100° to 240° C. in an increment of 10° C., the unfixed images were subjected to a fixing test at each temperature with a fixing device (fixing speed: 390 mm/sec) adjusted so that a total fixing pressure was 40 kgf. "UNICEF Cellophane" tape (MITSUBISHI PENCIL CO., LTD., width: 18 mm, JIS Z-1522) was adhered to the fixed images, and the resulting fixed images were allowed to pass through a fixing roller set at 30° C., and the tape was then removed. The optical reflective densities of the image before adhesion of the tape and after removal of the tape were measured with a reflective densitometer "RD-915" (manufactured by Macbeth Process Measurements Co.). The temperature of a fixing roller at which the ratio of the optical reflective densities (after removal of the tape/before adhesion of the tape) initially exceeds 90% is defined as the lowest fixing temperature. The low-temperature fixing ability was evaluated in accordance with the following evaluation criteria. The results are shown in Table 2-6. Here, the paper used in the fixing test was CopyBond SF-70NA (75 g/m²), manufactured by Sharp Corporation.

[Evaluation Criteria]
A: The lowest fixing temperature is lower than 150° C.
B: The fixing temperature is 150° C. or higher and lower than 170° C.
C: The fixing temperature is 170° C. or higher.

2.14 Test Example 2 [Storage Property]

Four grams of a toner was allowed to stand for 72 hours under environmental conditions of a temperature of 55° C. and relative humidity of 60%. After allowing the toner to stand, the extent of generation of toner aggregation was visually observed, and the storage property was evaluated in accordance with the following evaluation criteria. The results are shown in Table 2-6.
[Evaluation Criteria]
A: The aggregation is not found at all even after 72 hours.
B: Although the aggregation is not found after 48 hours, the aggregation is found after 72 hours.
C: The aggregation is found within 48 hours.

2.15 Test Example 3 [Triboelectric Stability under High-Temperature, High-Humidity Conditions]

A 50 ml polyethylene bottle was charged with 0.6 g of a toner and 19.4 g of a silicone ferrite carrier (manufactured by Kanto Denka Kogyo, average particle size: 90 under the high-temperature, high-humidity conditions of a temperature of 32° C. and a relative humidity of 85%, provided that in Example 20 a carrier was changed to a ferrite carrier ("P-01": standard product of Image Society of Japan, average particle size: 70 μm), and the components were mixed with a ball-mill at a rate of 250 r/min, and triboelectric charges of the toner were determined with a Q/M meter (manufactured by EPPING) in accordance with the following method.

After a given period of mixing time, a developer in defined amounts was supplied into a cell provided in the Q/M meter, and only the toner was aspirated for 90 seconds through a sieve having a sieve opening of 32 (made of stainless steel, twilled, wire diameter: 0.0035 mm). The voltage change generated on the carrier at this time was monitored, and a value for [a total electrical charge (μC) after 90 seconds)/amount (g) of toner aspirated] was defined as triboelectric charges (μC/g). A ratio between triboelectric charges after a mixing time of 180 seconds and triboelectric charges after a mixing time of 1,200 seconds, i.e. triboelectric charges after a mixing time of 1,200 seconds/triboelectric charges after a mixing time of 180 seconds, was calculated, and triboelectric stability was evaluated in accordance with the following evaluation criteria. The results are shown in Table 2-6.
[Evaluation Criteria]
A: 0.8 or more
B: 0.6 or more and less than 0.8
C: less than 0.6

2.16 Test Example 4 [Durability]

A toner was loaded to a printer "PAGEPRESTO N-4" (manufactured by CASIO COMPUTER CO., LTD., fixing: contact-fixing method, development method: nonmagnetic monocomponent development method, diameter of developer roller: 2.3 cm), and printing was conducted continuously on obliquely striped patterns having a print coverage of 5.5% under the environmental conditions of 32° C. and humidity of 85%. During the course of printing, black solid images were printed for every 500 sheets, and the presence or absence of the lines on the formed images was confirmed. At the point where the generation of the lines was confirmed, printing was stopped. The test was conducted up to 5,000 sheets at the maximum. Durability was evaluated by defining the number of printed sheets at the point where the generation of lines was visually confirmed on the images as the number of sheets at which lines were generated by fusion or fixing of toner on a developer roller, in accordance with the following evaluation criteria. In other words, it can be judged that the larger the number of sheets without generation of lines, the higher the durability of toner. The results are shown in Table 2-6.

[Evaluation Criteria]
A: No lines are generated up until printing 5,000 sheets.
B: Lines are generated on printing 2,000 sheets or more and less than 5,000 sheets.
C: Lines are generated on printing less than 2,000 sheets.

TABLE 11

Table 2-6

| | Composition of Toner | | | | | Evaluation of Toner | | | |
|---|---|---|---|---|---|---|---|---|---|
| | Resin Binder (Parts by Weight) | | Colorant | Charge Control Agent | Charge Control Resin | External Additive | Low-Temp. Fixing Ability | Storage Ability | Triboelectric Stability | Durability |
| No. 2- | | Reaction Product[1] | | | | | | | | |
| Ex. 1 | Resin A1 | A(20) | Black | S-34 | none | R-972 | A | A | A | A |
| Ex. 2 | Resin A2 | B(20) | Black | S-34 | none | R-972 | A | B | A | B |
| Ex. 3 | Resin A3 | C(20) | Black | S-34 | none | R-972 | A | B | A | A |
| Ex. 4 | Resin A4 | D(20) | Black | S-34 | none | R-972 | A | A | A | A |
| Ex. 5 | Resin A5 | E(20) | Black | S-34 | none | R-972 | A | A | A | A |
| Ex. 6 | Resin A6 | F(20) | Black | S-34 | none | R-972 | A | A | A | A |
| Ex. 7 | Resin A7 | G(20) | Black | S-34 | none | R-972 | A | B | A | B |
| Ex. 8 | Resin A8 | H(20) | Black | S-34 | none | R-972 | B | B | A | A |
| Ex. 9 | Resin A1 | A(20) | Yellow | LR-147 | none | R-972 | A | A | A | A |
| Ex. 10 | Resin A1 | A(20) | Magenta | LR-147 | none | R-972 | A | A | A | A |
| Ex. 11 | Resin A1 | A(20) | Cyan | LR-147 | none | R-972 | A | A | A | A |
| Ex. 12 | Resin A9 | A(20) | Black | S-34 | none | R-972 | A | B | A | B |
| Ex. 13 | Resin A10 | A(8.9) | Black | S-34 | none | R-972 | A | A | B | A |
| Ex. 14 | Resin A11 | A(18.2) | Black | S-34 | none | R-972 | A | A | A | A |
| Ex. 15 | Resin A12/ Resin A13[2] | A(20)/ A(20) | Black | S-34 | none | R-972 | A | A | A | A |
| Ex. 16 | Resin A14 | A(40) | Black | S-34 | none | R-972 | A | B | A | B |
| Ex. 17 | Resin A15 | A(20) | Black | S-34 | none | R-972 | B | A | A | A |
| Ex. 18 | Resin H1 | A(20) | Black | S-34 | none | R-972 | B | B | A | A |
| Ex. 19 | Resin H2 | A(8.9) | Black | S-34 | none | R-972 | B | B | B | A |
| Ex. 20 | Resin A1 | A(20) | Black | S-34 | FCA-701PT | R-972 | A | A | A | A |
| Ex. 21 | Resin A1 | A(20) | Black | S-34 | none | TG-C243 | B | A | A | A |
| Ex. 22 | Resin A1 | A(20) | Black | E-84 | none | R-972 | A | A | A | A |
| Comp. Ex. 1 | Resin B1 | none | Black | S-34 | none | R-972 | A | B | C | B |
| Comp. Ex. 2 | Resin B2 | none | Black | S-34 | none | R-972 | B | A | C | A |

[1] The reaction product used in the production of resins, and the numerical figures inside parenthesis shows Reaction Product/(Alcohol Component + Carboxylic Acid Component) × 100 (weight ratio).
[2] Resin A12 and Resin A13 were used in a 1:1 weight ratio.

It can be seen from the above results that the toners of Examples 2-1 to 2-22 each containing as a resin binder a polyester obtained from a reaction product formed between a specified aromatic compound and a carboxylic acid are favorable in all of low-temperature fixing ability, storage property and durability of toners, and further excellent in triboelectric stability of toners, as compared to the toners of Comparative Examples 2-1 and 2-2.

INDUSTRIAL APPLICABILITY

The polyester resin for a toner of the present invention is suitably used for a resin binder of a toner used in developing and the like of latent images formed in electrophotography, electrostatic recording method, electrostatic printing method or the like.

The invention claimed is:

1. A toner for electrophotography, comprising a resin binder, wherein said resin binder comprises at least one polyester resin, wherein
said at least one polyester resin is obtained by polycondensing a carboxylic acid component and an alcohol component, wherein at least one of said carboxylic acid component and said alcohol component is an aromatic compound represented by formula (Ia):

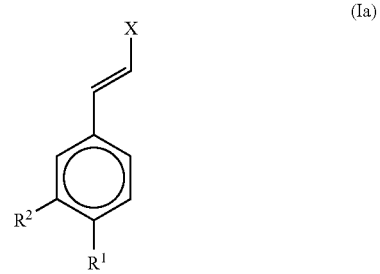

(Ia)

wherein each of $R^1$ and $R^2$ is independently a hydrogen atom or a hydroxyl group, and X is $-COOR^3$, wherein $R^3$ is a hydrogen atom or an alkyl group having 1 to 3 carbon atoms, or —CH$_2$OH, with proviso that a case where both of R$^1$ and R$^2$ are hydrogen atoms is excluded, wherein said aromatic compound represented by formula (Ia) is present in an amount of from 2.5 to 25% by mol of the total amount of said carboxylic acid component and said alcohol component in said at least one polyester resin.

2. A toner according to claim 1, wherein said aromatic compound represented by formula (Ia) comprises at least one member selected from the group consisting of coumaric acid and caffeic acid.

3. A toner according to claim 1, wherein said aromatic compound represented by formula (Ia) is at least one member selected from the group consisting of coumaric acid and caffeic acid, and at least one member selected from the group consisting of coumaryl alcohol and caffeyl alcohol.

4. A toner according to claim 1, wherein said alcohol component comprises an aliphatic diol.

5. A toner according to claim 1, wherein said resin binder comprises a high-softening point resin, having a softening point of from 125° to 160° C., and a low-softening point resin, having a softening point of 90° C. or higher and lower than 125° C., and said at least one polyester resin is said high-softening point resin or said low-softening point resin.

6. A toner according to claim 5, wherein said at least one polyester resins is said low-softening point resin.

7. A toner according to claim 1, wherein said at least one polyester resin has an acid value of from 10 to 70 mgKOH/g.

8. A toner according to claim 1, wherein said carboxylic acid component comprises a tricarboxylic or higher polycarboxylic acid compound in an amount of from 1 to 25% by mol of said carboxylic acid component.

9. A toner according to claim 1, wherein said carboxylic acid component comprises a tricarboxylic or higher polycarboxylic acid compound in an amount of from 1 to 25% by mol of said carboxylic acid component, and wherein said at least one polyester resin has an acid value of from 10 to 70 mgKOH/g.

10. A toner according to claim 1, wherein said aromatic compound represented by formula (1a) is at least one member selected from the group consisting of coumaryl alcohol and caffeyl alcohol.

11. A toner according to claim 1, wherein said aromatic compound represented by formula (1a) is at least one member selected from the group consisting of coumaryl alcohol and caffeyl alcohol, wherein said carboxylic acid component comprises a tricarboxylic or higher polycarboxylic acid compound in an amount of from 1 to 25% by mol of said carboxylic acid component, and wherein said at least one polyester resin has an acid value of from 10 to 70 mgKOH/g.

12. A toner according to claim 1, wherein said aromatic compound represented by formula (Ia) is present in an amount of from 7 to 15% by mol of the total amount of said carboxylic acid component and said alcohol component.

13. A toner according to claim 1, which exhibits a ratio of triboelectric charge of 0.6 or more for mixing with a silicone ferrite carrier with a ball mill at a rate of 250 r/min for a time of 1,200 seconds : 180 seconds.

14. A toner for electrophotography, comprising a resin binder, wherein said resin binder comprises a first polyester resin and a second polyester resin, wherein
both of said first and second polyester resins are obtained by polycondensing a carboxylic acid component and an alcohol component, wherein at least one of said carboxylic acid component and said alcohol component is an aromatic compound represented by formula (Ia):

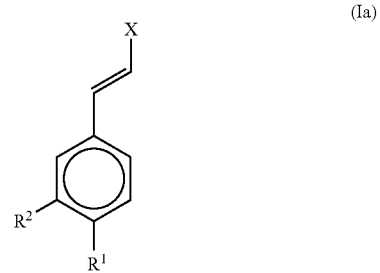

wherein each of R$^1$ and R$^2$ is independently a hydrogen atom or a hydroxyl group, and X is —COOR$^3$, wherein R$^3$ is a hydrogen atom or an alkyl group having 1 to 3 carbon atoms, or —CH$_2$OH, with proviso that a case where both of R$^1$ and R$^2$ are hydrogen atoms is excluded, wherein said aromatic compound represented by formula (Ia) is present in an amount of from 2.5 to 25% by mol of the total amount of said carboxylic acid component and said alcohol component, and
wherein said first polyester resin is a high-softening point resin, having a softening point of from 125° to 160° C., and said second polyester resin is a low-softening point resin, having a softening point of 90° C. or higher and lower than 125° C.

15. A toner according to claim 14, which exhibits a ratio of triboelectric charge of 0.6 or more for mixing with a silicone ferrite carrier with a ball mill at a rate of 250 r/min for a time of 1,200 seconds : 180 seconds.

* * * * *